United States Patent
Rutherford et al.

(10) Patent No.: US 6,237,874 B1
(45) Date of Patent: *May 29, 2001

(54) ZONED AIRCRAFT DE-ICING SYSTEM AND METHOD

(75) Inventors: Robert B. Rutherford, Kirtland; Richard L. Dudman, Euclid, both of OH (US)

(73) Assignee: Northcoast Technologies, Chardon, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/419,466

(22) Filed: Oct. 15, 1999

Related U.S. Application Data

(63) Continuation-in-part of application No. 09/364,804, filed on Jul. 30, 1999, which is a continuation-in-part of application No. 08/935,165, filed on Sep. 22, 1997, now Pat. No. 5,934,617.

(51) Int. Cl.[7] .................................................. B64D 15/00
(52) U.S. Cl. ................................ 244/134 E; 244/134 D; 244/134 R
(58) Field of Search ........................... 244/134 E, 134 D, 244/134 R, 123, 133; 219/202, 535, 548, 553

(56) References Cited

U.S. PATENT DOCUMENTS

| | | |
|---|---|---|
| 2,106,323 * | 1/1938 | Huntington . |
| 2,167,972 * | 8/1939 | Crawford . |
| 2,406,367 | 8/1946 | Griffith et al. . |
| 2,454,874 | 11/1948 | Hunter . |
| 2,464,273 | 3/1949 | Tanchel . |
| 2,590,944 | 4/1952 | Cowdrey et al. . |
| 2,665,090 | 1/1954 | Holdaway et al. . |
| 2,686,640 | 8/1954 | Neel, Jr. et al. . |

(List continued on next page.)

FOREIGN PATENT DOCUMENTS

| | | |
|---|---|---|
| 0 749 894 | 12/1996 | (EP) . |
| 2 756 254 | 5/1998 | (FR) . |
| 2 319 943 | 6/1998 | (GB) . |
| WO 94/26590 | 11/1994 | (WO) . |
| WO 95/15670 | 6/1995 | (WO) . |
| WO 99/15405 | 4/1999 | (WO) . |

OTHER PUBLICATIONS

Aircraft Icing Handbook, Report# DOT/FAA/CT–88/8–2, I I I 2, pp. 1–6, 9, 15–17, 21,23–26.

(List continued on next page.)

*Primary Examiner*—Charles T. Jordan
*Assistant Examiner*—Tien Dinh
(74) *Attorney, Agent, or Firm*—Jones, Day, Reavis & Pogue

(57) ABSTRACT

An electrothermal zoned de-icing system for an aircraft employs a heat-conducting tape bonded to the leading edge of an aircraft structure subject to an impinging airstream during flight. The heat-conducting tape has a spanwise parting strip area, and first and second ice accumulation and shedding zones. The tape comprises a non-metallic electrical and heat-conducting layer consisting of flexible expanded graphite foil laminated to an outer heat-conducting layer, in which the thickness of the flexible expanded graphite foil layer in the parting strip area is always greater than the thickness of the foil layer in either of the ice accumulation and shedding zones. Therefore, the parting strip area has a decreased electrical resistance, a greater flow of current, and becomes hotter than the zones in which the foil layer is thinner. Because the flexible expanded graphite foil is a monolithic structure that may be shaped, sculptured or layered to form different thicknesses in different areas, only a single control mechanism for a single set of electric terminals is necessary to produce temperature differentials in the parting strip and ice accumulation and shedding zones for a cycled zoned de-icing system.

55 Claims, 30 Drawing Sheets

U.S. PATENT DOCUMENTS

| | | |
|---|---|---|
| 2,757,273 * | 7/1956 | Taylor . |
| 2,787,694 | 1/1957 | Farries . |
| 2,791,668 | 5/1957 | Cowdrey et al. . |
| 3,002,718 | 10/1961 | Hackenberger, Jr. . |
| 3,013,752 * | 12/1961 | Rush . |
| 3,178,560 | 4/1965 | Mapp et al. . |
| 3,397,302 | 8/1968 | Hosford . |
| 3,404,061 | 10/1968 | Shane et al. . |
| 3,420,476 | 1/1969 | Volkner et al. . |
| 3,553,834 | 1/1971 | Olstowski . |
| 3,719,608 | 3/1973 | Olstowski . |
| 3,748,522 | 7/1973 | Geppert . |
| 4,021,008 | 5/1977 | Eichenauer . |
| 4,036,457 | 7/1977 | Volkner et al. . |
| 4,181,583 | 1/1980 | Steiger et al. . |
| 4,250,397 | 2/1981 | Gray et al. . |
| 4,282,184 | 8/1981 | Fiegl et al. . |
| 4,457,491 | 7/1984 | Dudman . |
| 4,490,828 | 12/1984 | Fukuhara et al. . |
| 4,659,421 | 4/1987 | Jewett . |
| 4,737,618 | 4/1988 | Barbier et al. . |
| 4,808,481 | 2/1989 | Luxin . |
| 4,942,078 | 7/1990 | Newman et al. . |
| 4,972,197 | 11/1990 | McCauley et al. . |
| 5,022,612 | 6/1991 | Berson . |
| 5,100,737 | 3/1992 | Colombier et al. . |
| 5,165,859 * | 11/1992 | Monroe . |
| 5,192,605 | 3/1993 | Mercuri et al. . |
| 5,198,063 | 3/1993 | Howard et al. . |
| 5,248,116 | 9/1993 | Rauckhorst . |
| 5,344,696 | 9/1994 | Hastings et al. . |
| 5,449,134 * | 9/1995 | Weisend . |
| 5,475,204 | 12/1995 | Giamati et al. . |
| 5,544,845 | 8/1996 | Giamati et al. . |
| 5,584,450 | 12/1996 | Pisarski . |
| 5,629,559 | 5/1997 | Miyahara . |
| 5,657,951 | 8/1997 | Giamati . |
| 5,934,617 | 10/1999 | Rutherford . |
| 5,947,418 | 9/1999 | Bessiere et al. . |

OTHER PUBLICATIONS

Aerospace Engineering, May 1997, pp. 9–10.

G–IV Pilot Training Manual, Gulfstream Aircraft.

Specification, Staystik™ Thermoplastic Adhesives, Alpha Metals.

Grafoil® Brand Flexible Graphite, Engineering Design Manuel, vol. one (UCAR Carbon Company).

Grafoil® Flexible Graphite Materials (UCAR Carbon Company).

Bradley, Perry. Thermion's ice–fighter. Business & Commercial Aviation, Sep. 1997, 106–111.

* cited by examiner

Thickness & Density

Volts DC/Amps

THERMOCOUPLE LOCATION
LEADING EDGE 182R

THERMOCOUPLE LOCATION
LEADING EDGE LANCAIR IV

ZONED AIRCRAFT DE-ICING SYSTEM AND METHOD

This application is a continuation-in-part of U.S. patent application, Ser. No. 09/364,804, filed Jul. 30, 1999, pending which is a continuation-in-part of U.S. patent application Ser. No. 08/035,165, filed Sep. 22, 1997 now U.S. Pat. No. 5,934,617.

BACKGROUND OF THE INVENTION

Aircraft, during flight and/or while on the ground, may encounter atmospheric conditions that cause the formation of ice on airfoils and other surfaces of the aircraft structure, including wings, stabilizers, rudder, ailerons, engine inlets, propellers, rotors, fuselage and the like. Accumulating ice, if not removed, can add excessive weight to the aircraft and alter the airfoil configuration, causing undesirable and/or dangerous flying conditions. General aviation aircraft are particularly susceptible to the detrimental consequences of ice formation because only small amounts of ice on structural members, such as wings, tail, propellers, and the like, can significantly alter flight characteristics.

Since the earliest days of flight, attempts have been made to overcome the problem of ice accumulation, and mechanical, chemical and thermal de-ice and/or anti-ice systems have been developed for use in large commercial and military aircraft. Thermal systems include those in which bleed air or hot air from one of the compressor stages of a turbine aircraft are diverted to heat the airfoil leading edges. Other thermal systems employ electrically conductive resistance heating elements, such as those contained in beating pads bonded to the leading edges of the aircraft, or on the propeller or rotor blades, or incorporated into the structural members of the aircraft. Heating pads of this type usually consist of a thermally insulating material in contact with wire or other metal heating elements dispersed throughout the insulating layer. Because heat must be transferred from the metal heating elements to the surrounding insulating areas, these heaters are inefficient insofar as the energy and time required for heat up to a required temperature, and the time required for cool-down when the current is removed. Electrical energy for the heating elements is derived from a generating source driven by one or more of the aircraft engines or an auxiliary power unit. The electrical energy is continuously supplied to provide enough heat to prevent the formation of ice, or intermittently supplied to loosen accumulating ice. However, such systems are only usable where sufficient wattage is available to raise and/or maintain the temperature of the airfoil surface above the freezing point at typical aircraft speeds in icing conditions.

Electrothermal anti-ice and de-ice systems are classified as either evaporative or "running wet". Anti-ice evaporative systems supply enough heat to evaporate substantially all water droplets impinging upon the heated surface. The running wet de-icing systems, however, provide only enough heat to prevent freezing of the water droplets. The water then flows aft of the heated surface where it freezes, resulting in what is commonly known as runback ice. In "zoned" de-icing systems, runback ice is removed periodically by rapid application of sufficient heat to melt and loosen the ice bonded at the surface-ice interface; the bulk of the ice is then removed by aerodynamic or centrifugal forces.

In many heating pads used for electrothermal zoned de-icing systems, metal heating elements are configured as serpentine ribbons that form interconnected conductive segments. Because of the low electrical resistivity of metal heating elements, such as copper, aluminum, and the like, the serpentine configuration is designed to provide sufficient length to the element to achieve a high enough resistance to generate energy. Each ribbon is individually electrically energized by a pair of contacts, one on each end of the ribbon, and a current is transmitted through the ribbon by establishing a voltage differential between its corresponding pair of contacts, resulting in heating of the element. Heating pads such as these are described in U.S. Pat. Nos. 5,475,204 and 5,657,951. One of the problems described in association with zoned de-icing systems employing heating pads of this type is that cold spots tend to develop at intersegmental gaps between the electrically conductive segments and at interheater gaps between adjacent zones. Ice formed at these cold spots can be very difficult to melt without the consumption of excessive current. Further, in this type of heating pad, each metallic heating element requires its own electrical terminations or contact strips. Because they are not heated, the melting of ice on or around the contact strips can also be very difficult. Accumulation of ice at the intersegmental and interheater gaps and around the contact strips is particularly undesirable since the accumulated ice can serve as an "anchor" for additional ice formation. In an attempt to address the problem of "cold spots", an electrothermal de-icing pad described in U.S. Pat. No. 5,475,204 provides at least two heaters having conductive heating elements that are positioned relative to each other so that the marginal portions are overlapped in an attempt to eliminate gaps. However, as with other previously described electrothermal de-icing systems, these heaters have multiple heating zones containing a plurality of metallic heating elements, including a plurality of electrical terminations, requiring the use of complex control mechanisms that rely on multiple timers to control multiple zones.

As discussed above, the use of electrothermal heating pad systems is only feasible where sufficient wattage is available to raise and/or maintain the temperature of the airfoil surface above the freezing point at typical aircraft speeds in icing conditions. Because of the configuration of the metal elements in these pads, the watt densities are not uniformly distributed, resulting in substantial heating inefficiencies in terms of the average watt density provided. The power requirements for the anti-ice and/or de-ice systems using these metallic heating pads are large. Therefore, electrothermal systems that have been successfully used in large aircraft have been impractical for general aviation light aircraft, such as single engine and light twin airplanes and helicopters, because of power requirements that are in excess of the electrical power available. Moreover, auxiliary on-board power generating units for de-icing systems have not been employed in light aircraft because of the substantial weight and expense penalty that would be incurred.

Thus, there is a need for an ice protection system for all aircraft, including general aviation light aircraft, that has sufficient operating efficiency to protect aircraft structural members, such as the wings, tail structures, propeller, rotor blades, and the like, against the accumulation of ice, that is light weight, that does not interfere with aircraft flight characteristics, and that is economical. More particularly, there is a need for an efficient thermoelectric heater system that can be "zoned" to provide an effective de-ice system in which electrical energy can be intermittently or continuously supplied to provide heat sufficient to prevent the formation of ice or to loosen accumulating ice.

Recently, technology has been developed to allow a light aircraft to be fitted with a 150 ampere to 200 ampere alternator producing 40 to 60 volts, without a significant weight penalty. It is now possible that a combination of a very efficient thermoelectric heater, in terms of the watt density provided by the heater, and such an alternator, could also allow general aviation aircraft to utilize reliable electrothermal in-flight anti-ice/de-ice systems.

SUMMARY OF THE INVENTION

The invention provides an efficient electrothermal heater that can be used in a de-ice and/or anti-ice system for all aircraft, including general aviation light aircraft, because the watt densities provided by the heater are sufficient to melt or loosen accumulating ice using the power available in large aircraft or in light aircraft augmented with, if necessary, an on-board lightweight, high-output, auxiliary alternator, such as that described above. In particular, the invention provides a lightweight heat-conducting tape bonded to the surface of an aircraft structure that includes a leading edge, for electrothermally removing ice from or preventing the formation of ice on the surface during in-flight and/or on the ground icing conditions. Although the heat-conducting tape is herein described for use on aircraft surfaces, the tape may be used for any surface which requires anti-ice or de-ice capability and where a power source is available. Such applications include roofs, gutters, pipes, automobile hoods and trunks, and the like.

One embodiment of the invention, employing such a heat-conducting tape for use as an anti-ice/de-ice system, is disclosed in our U.S. Pat. No. 5,934,617. The entire disclosure of this patent is hereby incorporated by reference.

In another embodiment of the invention, the heat-conducting tape is used in a zoned aircraft electrothermal de-icing system for an aircraft structural member that includes a leading edge subject to an impinging airstream during flight, said airstream passing over an outer surface of the structural member in a fore to aft direction, the system comprising a heat-conducting tape bonded to the outer surface of the structural member, the heat-conducting tape comprising a first area that forms a parting strip having a length disposed spanwise along the leading edge, a second area disposed spanwise above and aft of the parting strip forming a first ice accumulation and shedding zone, and a third area disposed spanwise below and aft of the parting strip forming a second ice accumulation and shedding zone. As used herein, the terms "disposed spanwise", "disposed above" and "disposed below" are used in reference to a substantially horizontal aircraft structure (e.g., a wing, a horizontal tail stabilizer, a helicopter rotor blade, and the like); but these terms are intended herein to be fully inclusive of a parting strip disposed along the length of a non-horizontal leading edge (e.g., a vertical tail stabilizer, an aircraft propeller blade, and the like) and ice accumulation and shedding areas which are disposed on one side and/or an opposite side of the parting strip.

The heat-conducting tape comprises at least two layers laminated to each other under heat and pressure, i.e., a non-metallic electrical and heat-conducting layer consisting of flexible expanded graphite foil, also known as vermiform graphite, laminated to an outer heat-conducting layer that is an electrical insulator and seals the interior of the tape against penetration and water damage. The flexible expanded graphite foil sheet of the heat-conducting tape has a first thickness in the parting strip, a second thickness in the first ice accumulation and shedding zone, and a third thickness in the second ice accumulation and shedding zone, and the thickness of the flexible expanded graphite foil sheet in the parting strip is greater than the thickness of the foil sheet in either of the first or the second ice accumulation and shedding zones.

The tape is bonded (e.g., by an adhesive) to an electrically insulating layer, such that the flexible expanded graphite layer is disposed between the heat-conducting outer layer and the insulating layer. The electrical insulating layer may be directly bonded to the tape to form a third layer before application to the aircraft surface. Alternatively, the electrical insulating layer may be a component of the aircraft surface to which the two-layer tape is applied.

A feature of this embodiment of the invention is that the flexible expanded graphite foil comprises a single, monolithic heating element that can be shaped, sculptured or layered in such a way as to vary the watt densities in the parting strip and the ice accumulation and shedding zones of the heating element in a predetermined manner. It is known that varying the length, width and/or thickness of flexible expanded graphite foil changes the electrical resistance along the length of the foil by a large magnitude and, as is known, the electrical resistance of a material determines the amount of electric current that will flow through the material. Consequently, for a given length and width, a section of the heat-conducting tape comprising a greater thickness of flexible expanded graphite foil has a lesser electrical resistance, a greater flow of current, and becomes hotter than sections in which the foil layer is thinner. In the zoned de-icing embodiment of the invention, the flexible expanded graphite foil layer of the heater has a thickness in the parting strip that is greater than the thickness of the foil in each of the first and the second ice accumulation and shedding zones. Therefore, the temperature of the parting strip exceeds the temperature of either of the two ice accumulation and shedding zones at all given power settings.

In a preferred embodiment, the flexible expanded graphite foil sheet is a continuous shaped sheet comprising a decreasing gradient of thicknesses between the parting strip and each of the ice accumulation and shedding zones. In another embodiment, the parting strip comprises at least two layered flexible expanded graphite foil sheets, and the layers are arranged to form a decreasing gradient of thicknesses between the parting strip and each of the ice accumulation and shedding zones. In yet another embodiment, the parting strip and one or both of the ice accumulation and shedding zones may be separate sections of the foil, but the ice accumulation and shedding sections are separated from the parting strip by a gap of no greater than about 60 mils. In this embodiment, one or more of the sections may be shaped to form a decreasing gradient of thicknesses between the parting strip section and the ice accumulation and shedding zones.

Regardless of the configuration of the flexible expanded graphite layer of the heat-conducting tape, a further feature of the zoned de-icing embodiment of the invention is that the flexible expanded graphite foil layer is preferably connected to a power source by a single set of two electrical terminals. A current is transmitted through the foil by establishing a voltage differential between its corresponding pair of terminals, resulting in heating of the foil. A given amount of power supplied to the flexible expanded graphite layer results in watt densities that differ between the parting strip and the ice accumulation and shedding zones, as governed by the predetermined thicknesses in these areas, and the temperature of the parting strip always exceeds that of the ice accumulation and shedding zones. Therefore, only a single control mechanism for a single set of electric terminals is necessary to produce desired watt densities and temperatures in the parting strip and ice accumulation and shedding zones, resulting in zoned de-icing system that is greatly simplified compared to previously known systems. Moreover, the use of only two terminals results in substantially fewer termination points or contact strips as potential cold spots that could detrimentally become anchor points for ice accumulation.

When, or preferably prior to, encountering in-flight icing conditions, a programmable controller directs a supply of power from the power source to the flexible expanded graphite foil layer of the heat-conducting tape for a first period of time to maintain a first temperature of the outer heat-conducting layer at the parting strip that is sufficient to prevent freezing of impinging water droplets and to allow water droplets to flow aft from the parting strip to the first and/or the second ice accumulation and shedding zones of the heat-conducting tape. The first temperature is above 32° F., preferably about 32° F. to about 50° F., more preferably about 35° F. to about 45° F. The power supply is also sufficient in the first period of time to maintain a second temperature of the outer heat-conducting layer at the first and second ice accumulation and shedding zones which does not exceed 32° F. The water droplets flowing aft from the parting strip form ice and/or an ice-to-surface bond on the outer heat-conducting layer at the first and/or second zones. The first time period allowed for ice accumulation at the first and second ice accumulation and shedding zones is about 10 seconds to about 5 minutes, depending on the rate of ice accretion under the icing conditions encountered. Subsequently, at the end of the first time period, the controller directs an increased power supply to the flexible expanded graphite foil layer wherein the increased power supply is sufficient to maintain a third temperature of the outer heat-conducting layer at the first and/or second ice accumulation and shedding zones at greater than 32° F. for a second time period sufficient to melt the ice-to-surface bond and to allow formed ice to be shed into an impinging airstream. Preferably the third temperature is about 34° F. to about 40° F. and the second time period is about 5 seconds to about 60 seconds.

The application of power for the second time period also increases the temperature of the parting strip. Due to the efficient thermal conductivity of the flexible expanded graphite foil, heat from the parting strip is conducted aft, into the ice accumulation and shedding zones, thus reducing the power required to raise the temperature in these zones. The cycle of runback freezing of the water droplets and intermittent ice removal is then repeated as often as necessary until icing conditions no longer exist.

The heat-conducting outer layer may comprise any heat-conducting material that is essentially an electrical non-conductor. Preferably, the heat-conducting outer layer comprises a thermoplastic or thermoset material containing a heat-conducting inorganic filler. More preferably, the heat-conducting layer comprises a thermoplastic material, such as polyurethane, with a filler selected from aluminum nitride, boron nitride, alumina, and the like.

Flexible expanded graphite foil suitable for use in the heat-conducting tape of the invention is a readily commercially available material that is relatively inexpensive. The flexible expanded graphite foil has an electrical resistivity along its length and width of about $2.7\times10^{-4}$ ohm-in. to about $3.2\times10^{-4}$ ohm-in., with an average of about $3.1\times10^{-4}$ ohm-in., and is fully electrically conducting without the necessity of including wire elements, metals or heat-conducting fibers within or through the layer. Because of the continuous, monolithic configuration of the flexible expanded graphite foil, the watt density throughout the heat-conducting tape is uniformly distributed. Thus, the heat-conducting tape of the invention is much more efficient than heating pads employing metal elements, and the measured watt densities are true watt densities rather than average watt densities. Because flexible expanded graphite foil is well suited, in terms of surface area to volume, for conducting heat and electricity, the wattage required for producing a rapid rise in temperature from ambient to that required for anti-ice and/or de-ice systems over a large surface area, is far less than that required by known electrical wire heating systems. In addition, flexible expanded graphite has a low thermal mass, enabling a rapid heat up and a rapid cool down when the current is removed.

The two- or three-layer heat-conducting tape is easily applied, using commercially available adhesives such as rubber-based adhesives, to any surface of the aircraft, including the fuselage, wings, ailerons, propeller or rotor blades, tail sections, including stabilizers and rudder, engine cowling, oil pan, and the like. In the zoned de-ice system described above, the tape is applied to an aircraft structure that includes a leading edge. The combination of the flexibility of the expanded graphite, the heat-conducting outer layer, with or without a flexible electrically insulating layer, provides a heat-conducting tape that is easy to die cut to size and configure to a variety of aircraft structural shapes, including control surfaces and other irregularly shaped removable and movable components. The heat-conducting tape is also light in weight and inexpensive compared to existing de-ice and anti-ice systems.

DESCRIPTION OF THE INVENTION

In a first embodiment of the invention disclosed in our U.S. Pat. No. 5,934,617, an electrothermal system for removal of ice from or prevention of the formation of ice on an outer surface of an aircraft structure comprises a heat-conducting tape that comprises at least two layers laminated to each other under heat and pressure, the layers comprising (i) a non-metallic electrical and heat-conducting layer consisting of a flexible expanded graphite foil sheet disposed between an outer heat-conducting layer and an electrically insulating layer that is bonded to or is a component of the aircraft surface.

Figure 1:
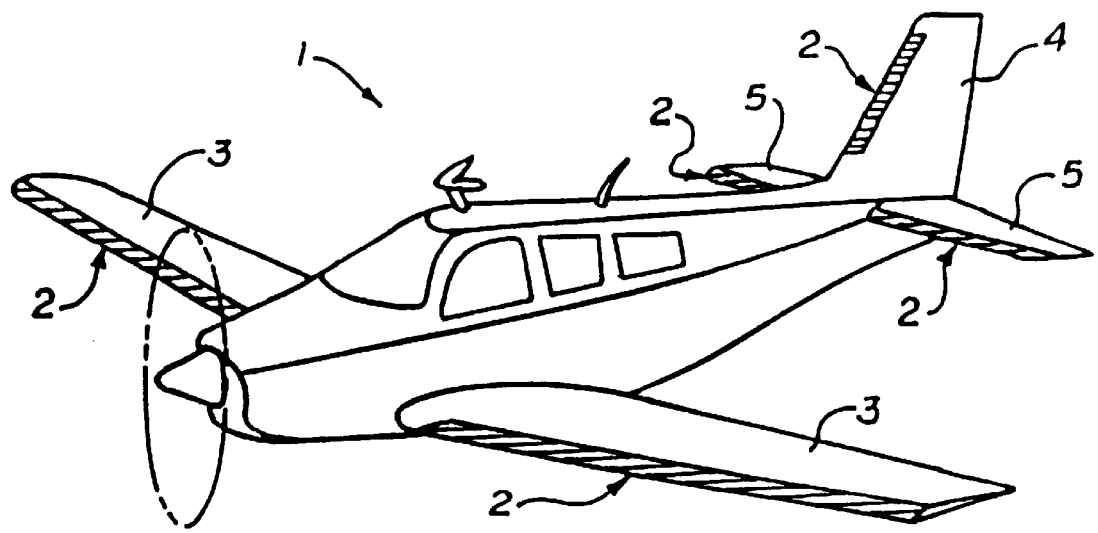
FIG. 1 is a schematic illustration of a single engine aircraft having the heat-conducting tape of the invention bonded to the leading edges of the wings, rudder and stabilizers.
Figure 2:
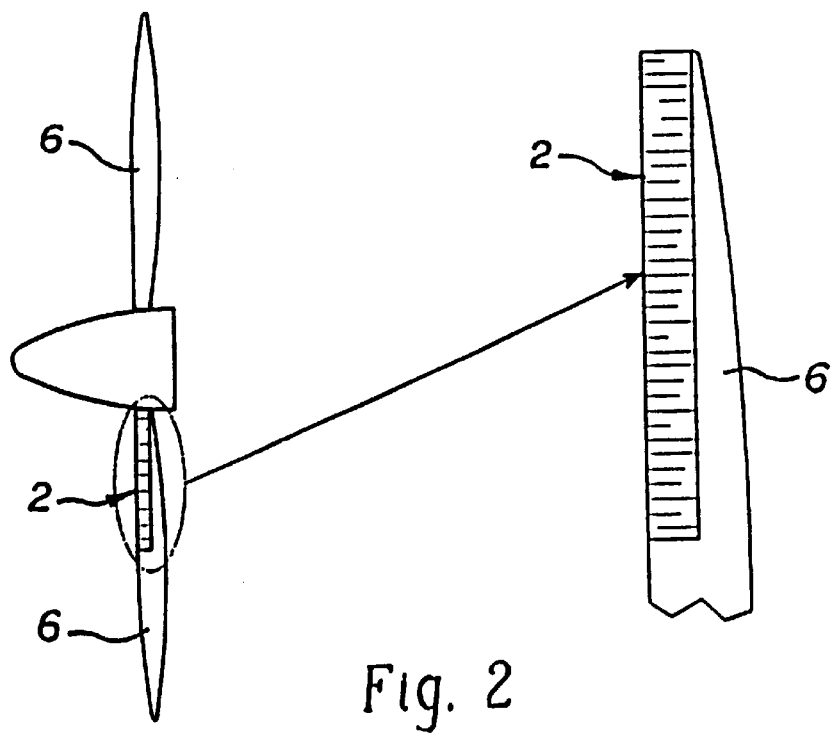
FIG. 2 is a schematic illustration of a propeller blade having the heat-conducting tape bonded to a leading edge.
Figure 3A:
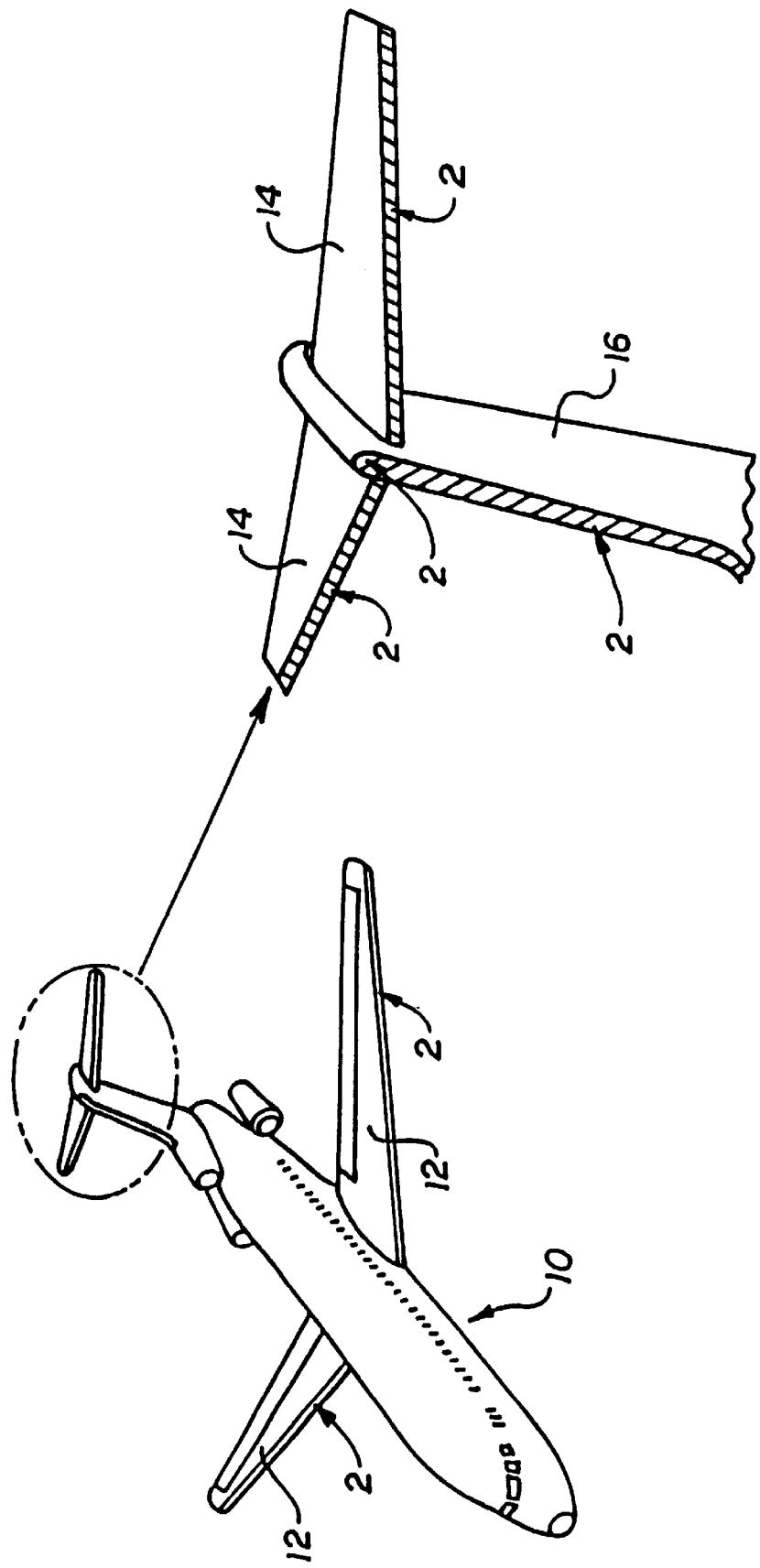
FIG. 3A is a schematic illustration of a jet aircraft having the heat-conducting tape bonded to the leading edges of the wings, rudder and stabilizers.

The heat-conducting tape of the first embodiment of the invention may be bonded to any surface or partial surface of any aircraft structure that is subject to the formation of ice. For example, as illustrated in FIGS. 1 and 2, structural areas to which the heat-conducting tape 2 of the first embodiment may be applied to a light aircraft 1 include, but are not limited to, the leading edges of the wings 3, rudder 4, stabilizers 5 and propeller blades 6, as well as other structures, such as the oil pan. As illustrated in FIG. 3A, the heat-conducting tape 2 of the first embodiment may also be applied to any structural area subject to icing in a commercial aircraft 10 including, without limitation, the leading edges of the wings 12, stabilizers 14 and rudder 16 sections, as well as other surfaces, including ailerons, flaps, engine cowling, and the like. The tail structures on commercial aircraft have historically been the most susceptible to in-flight ice hazards.

Figure 3B:
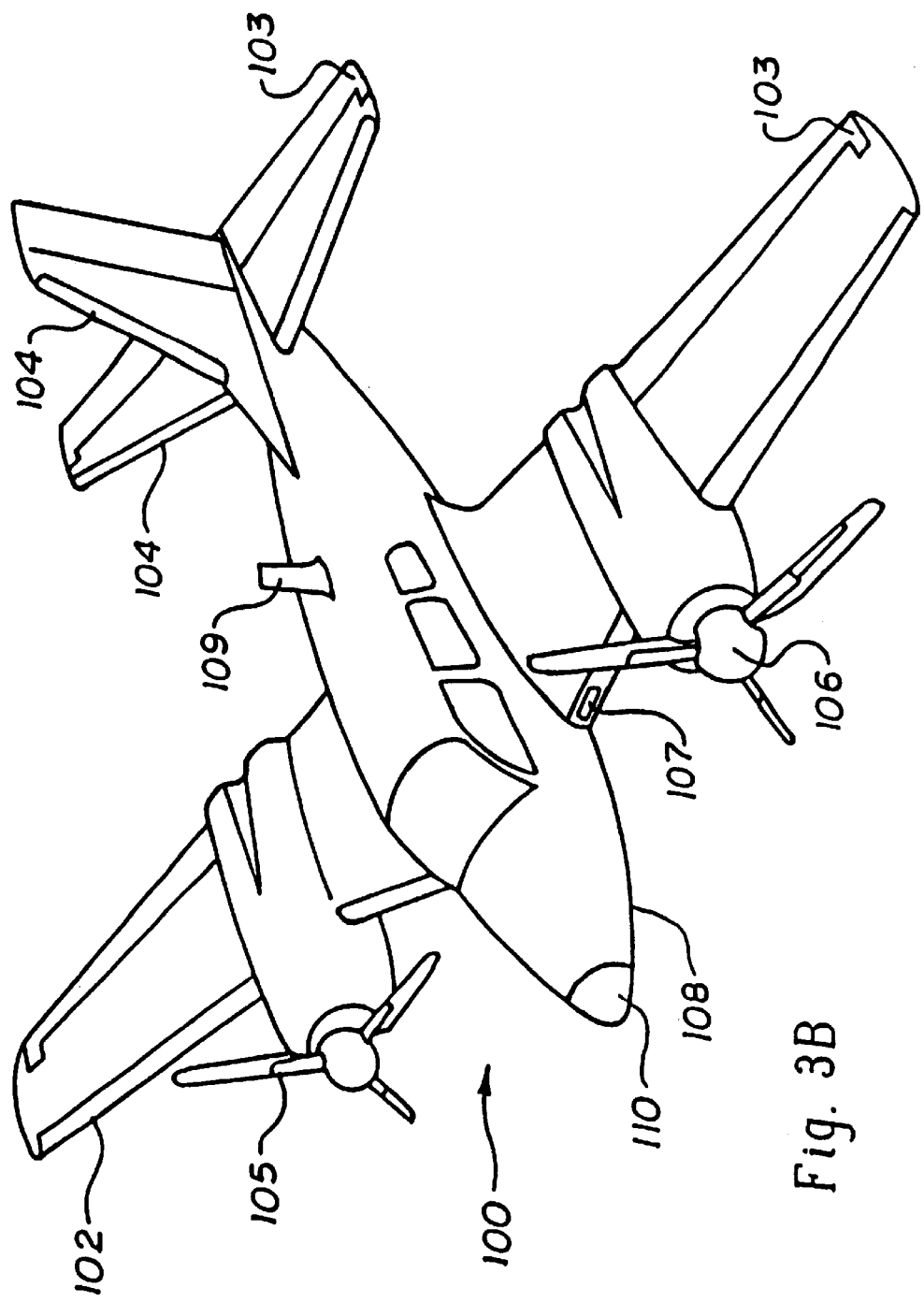
FIG. 3B is a schematic illustration of further areas to which the heat-conducting tape may be bonded to an aircraft, such as the leading edges of the wings, rudder, stabilizers, engine air inlets, auxiliary air inlets, propellers, antennas, balance horns, essential instruments and radome.

As illustrated in FIG. 3B, further structural areas to which the heat-conducting tape 2 of the first embodiment may be applied to a light aircraft, such as a twin engine aircraft 100 include, but are not limited to, the leading edges of the wings 102, empennage leading edges 104 of the rudder and stabilizers, balance horns 103, propeller blades 105, engine air inlets 106, as well as other structures, including auxiliary air inlets 107, essential external instruments 108, antennas 109 and oil pan (not shown).

In the zoned de-icing system embodiment of the invention, the aircraft structure to which the heat-conducting tape may be applied includes, without limitation, any leading edge of the aircraft such as those illustrated in FIGS. 1, 2, 3A and 3B including the leading edges of the wings, empennage leading edges of the rudder and the vertical and horizontal tail stabilizers, and propeller blades, including helicopter rotor blades.

Figure 4:
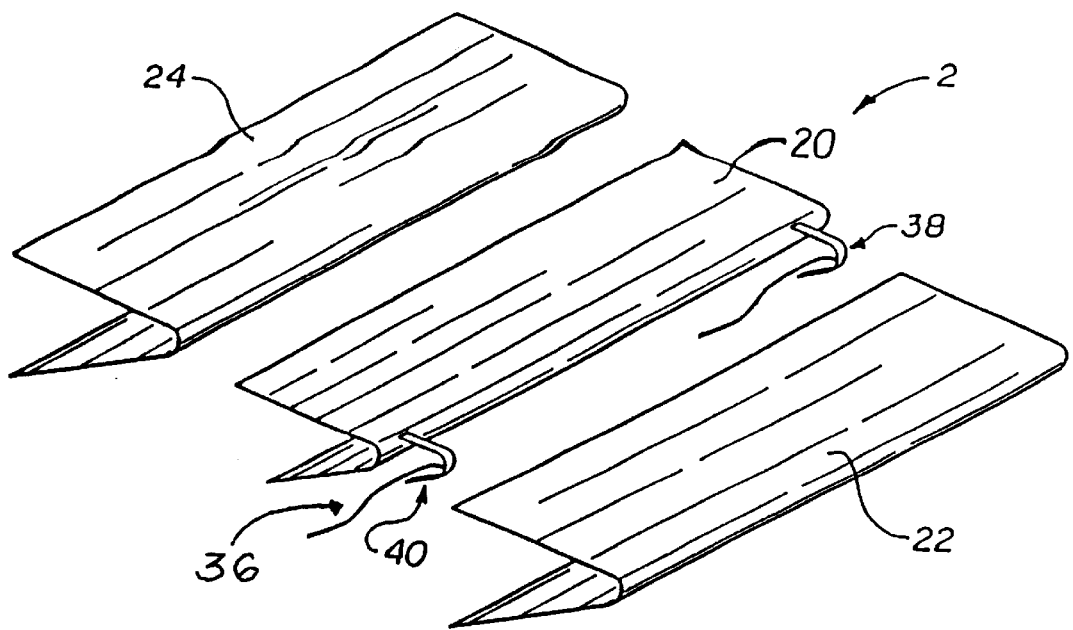
FIG. 4 is a schematic illustration of the components of the heat-conducting tape, including the flexible expanded graphite layer, the heat-conducting outer layer and the electrically insulating layer.
Figure 5:
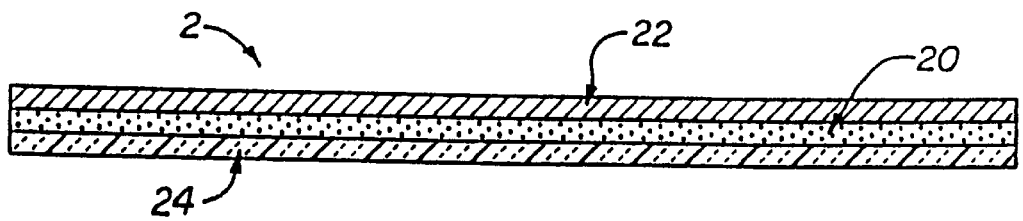
FIG. 5 is a cross section of the three-layer heat-conducting tape illustrating the flexible expanded graphite layer disposed between the heat-conducting outer layer and the insulating layer.

The structural components of the heat-conducting tape are generally illustrated in FIGS. 4 and 5. The heat-conducting tape 2 comprises a flexible expanded graphite foil layer 20 laminated to an outer heat-conducting layer 22 and disposed between the outer layer 22 and an electrically insulating layer 24. The flexible expanded graphite foil layer 20 is connectable to a power source by electrical terminal 40 which can be, for example, an edge connector or bus bar, or the like, and wiring system 36. Another edge connector or bus bar 38 is available for grounding the electrical circuit. In the first embodiment of the invention, the flexible expanded graphite foil is a sheet having a thickness of about 0.003 to about 0.125 inches, preferably about 0.025 to about 0.125 inches, more preferably about 0.003 to about 0.070 inches, and especially about 0.003 to about 0.030 inches. In the zoned de-icing system embodiment of the invention, the thickness of the flexible expanded graphite foil layer 20 in the heat-conducting tape 2 varies in a pre-determined manner in different areas of the tape, as described further below. The insulating layer 24 may be bonded to the flexible expanded graphite foil layer 20 by an adhesive, such as any rubber-based adhesive that maintains its bonding capability over a wide range of temperatures. An example of a readily available suitable adhesive is the rubber-based contact adhesive 1300-L (3M Company). Alternatively, the three layers of the heat-conducting tape may be laminated to each other under heat and pressure. For example, the area of outer heat-conducting layer may be larger than the area of the flexible expanded graphite foil sheet layer 20, and may be laminated directly to the insulating layer 24. The insulating layer 24 is bonded directly to an aircraft surface such as a leading edge section of an aluminum wing 30, as illustrated in a cut-away schematic in FIG. 6, also by means of an adhesive, such as the foregoing rubber-based contact adhesive.

When the aircraft structure already has an electrically insulating component, a two-part heat-conducting tape may be used that comprises the flexible expanded graphite layer 20 and the heat-conducting outer layer 22. For example, the aircraft surface may be painted or otherwise coated with an electrically insulating material, such as a polyurethane paint or an aluminized paint. The flexible expanded graphite layer 20 and the heat-conducting outer layer 22 are then bonded directly to the insulating component of the aircraft structure, with a rubber-based adhesive. Alternatively, the aircraft structure itself may be manufactured of an electrically non-conducting composite, such as fiberglass reinforced plastic, or the like. In this case, the flexible expanded graphite foil sheet 20 may be embedded in the composite during its manufacture, by methods known to those skilled in the art of composites, and a heat-conducting outer layer may be later painted or sprayed on or bonded to the composite surface with an adhesive. In this embodiment, the flexible expanded graphite foil sheet is in close proximity to or in contact with the heat-conducting layer in order to transfer heat to this layer. Examples of suitable paint or spray-on heat-conducting layers include polyurethane-based or aluminized paints, that contain inorganic fillers, such as aluminum nitride.

Flexible expanded graphite foil for use in the heat-conducting tape may be prepared, as is well known, by expanding graphite flakes many times and then compressing the expanded flakes to form a cohesive structure. The expansion of graphite flakes can be readily achieved by attacking the bonding forces between the layers of the internal structure of graphite, such as by the use of an acid. The result of such an attack is that the spacing between the superimposed layers can be increased so as to effect a marked expansion in the crystalline structure. By means of an intercalation or "between the layers" compound formation, subsequent high temperature heating effects a 100–1000 fold greater expansion, producing a worm-like or vermiform structure with highly active, dendritic, rough surfaces which may then be formed under pressure into a foam material, since the particles have the ability to adhere without a binder due to the large expansion. Sheets, and the like, are formed from the expanded graphite particles by simply increasing the compressive pressure, the density of the formed graphite being related to the applied formation pressure. A more complete description of the method of forming such flexible expanded graphite sheets can be found in U.S. Pat. No. 3,404,061.

The flexible expanded graphite sheet product is essentially pure graphite, typically 90–99.9% elemental carbon by weight, with a highly aligned structure. Only naturally occurring minerals (from the natural raw graphite materials) remain as impurities in the product in the form of essentially inert, chemically stable metal oxides and sulfate. The presence of these impurities is not essential to and does not contribute to the electrical and heat-conducting capabilities of the expanded graphite.

Although any suitable flexible expanded graphite foil sheet may be used in the present invention, it is preferred that the characteristics of the flexible expanded graphite sheet be equivalent to that provided as Grafoil® Brand Flexible Graphite, manufactured by UCAR Carbon Company. In the first embodiment of the invention, the density of the preferred flexible expanded graphite is about 50 to about 90 lbs./ft.$^3$, preferably about 70 lbs./ft.$^3$. In this embodiment, the preferred flexible expanded graphite foil has an electrical resistivity of about $1\times10^{-4}$ to about $10\times10^{-4}$ ohm-in., preferably about $2.8\times10^{-4}$ to about $7.5\times10^{-4}$ ohm-in. and, more preferably, about $3.1\times10^{-4}$ to about $6.5\times10^{-4}$ ohm-in, and has a thermal conductivity of about 140 W/M° K at 70° F. and about 44 W/M° K at 2000° F. Because of its excellent heat-conducting properties, flexible expanded graphite has been used in other applications, such as gaskets, valve stem or pump packings, and high temperature applications, such as thermal radiation shielding, furnace linings, and the like.

The preferred densities, electrical resistivity and resistances, and length, width and thicknesses of the flexible expanded graphite foil layer for use in the zoned de-icing system embodiment of the invention are discussed further below.

The outer heat-conducting layer 22 is preferably a thermoplastic or thermosetting material, including rubber or other elastomeric materials, that is a thermal conductor and an electrical insulator and is durable and abrasion-resistant.

Suitable materials include polyurethane, polyethylene, polyvinyl chloride, polyamides, polystyrenes, and the like. The preferred material is essentially non-electrically conducting, having a volume electrical resistivity of about $10^3$ ohm-in. to about $10^{12}$ ohm-in. The preferred outer heat-conducting layer has a thermal conductivity of about 0.1 watts/meter° K (W/M° K) to about 5 W/° K and, more preferably, about 0.5 W/M° K to about 4 W/M° K. In order for the material to be heat-conducting and electrically non-conducting, a heat-conductive inorganic compound or mixture of heat-conductive inorganic compounds is typically added as a filler during the manufacture of the material. Examples of inorganic compounds employed as fillers to confer these properties on a thermoplastic or thermosetting material are nitrides, such as aluminum nitride and boron nitride, alumina, silicon compounds, and the like. The manufacture of such thermoplastic and thermosetting materials containing these fillers is known to those skilled in the art of plastics compounding. Preferably, the heat-conducting outer layer in the heat-conducting tape of the invention comprises a thermoplastic material containing aluminum nitride, boron nitride, alumina, or mixtures of these, such as a Staystik thermoplastic adhesive, available from Alpha Metals, Inc., Cranston, R.I. The thermoplastic material may be in liquid, film or paste form. More preferably, the heat-conducting outer layer comprises a polyurethane film containing boron nitride or aluminum nitride. Most preferably, the polyurethane contains boron nitride.

The heat-conducting outer layer is preferably laminated under heat and pressure to the flexible expanded graphite layer to ensure the integrity of the heat transfer between the flexible expanded graphite foil sheet layer and the protective heat-conducting outer layer. Moreover, lamination of the outer layer to the foil substantial prevents the flaking off of pieces of the foil to assure a continuous foil layer for optimum electrical and heat conductivity. For example, a thermoplastic adhesive (Staystik™) may be suitably laminated to the flexible expanded graphite layer under heat and pressure conditions of 125° C. to 200° C. and 0 to 10 psi, respectively. The thickness of the heat-conducting outer layer in the heat-conducting tape is about 0.001 inches to 0.030 inches, preferably about 0.001 inches to 0.010 inches and, more preferably, about 0.005 inches.

The insulating base layer 24 may be comprised of any of a number of materials that are insulating for electricity, that are flexible enough to facilitate the installation of the heat-conducting tape onto irregularly shaped aircraft surfaces, and can be bonded, such as by an adhesive, to the heat-conducting outer layer and/or to the flexible expanded graphite layer. The electrically insulating material may or may not be also heat insulating. For example, it may be desirable to heat the aircraft surface under the heat-conducting tape. In this case, the selection of the electrically insulating layer includes a material that is not heat insulating. Suitable insulating base layers include, but are not limited to, elastomers, such as chloroprene, isoprene and neoprene, or thermoplastic or thermosetting materials containing inorganic heat-conducting fillers, alone or in combination with insulating fabrics, such as fiberglass cloth. The insulating layer has a thickness of about 0.005 inches to 0.250 inches.

Figure 6:
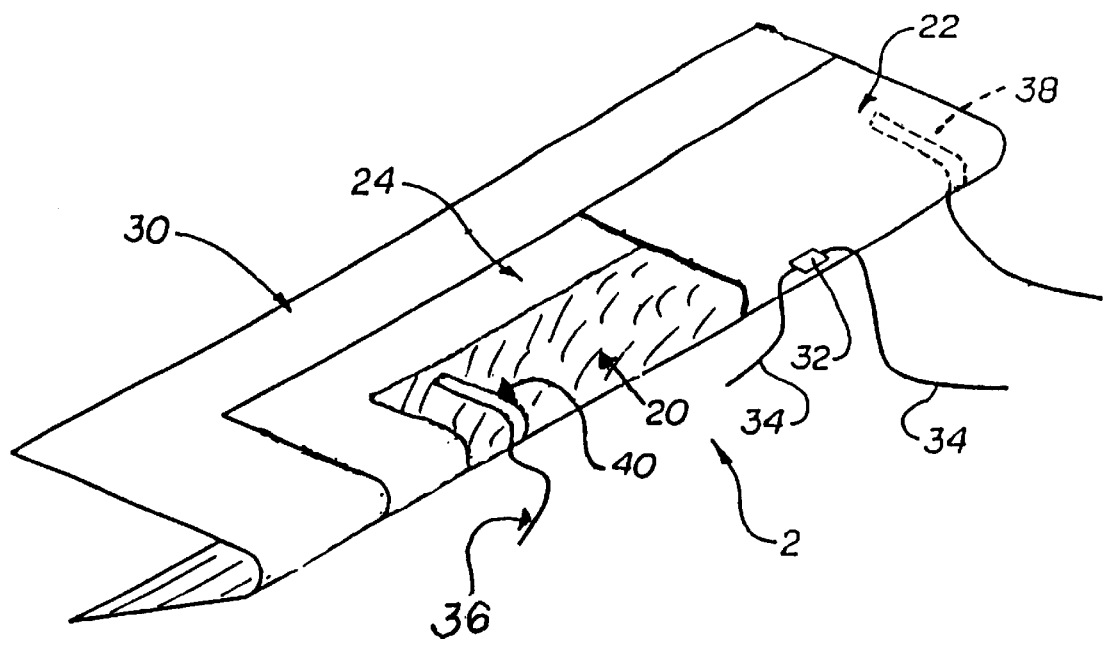
FIG. 6 is a schematic cut-away illustration of a wing section having the heat-conducting tape of the invention bonded to a portion of the leading edge surface.

As further illustrated in FIG. 6, in order to assess, in real time, the amount of heat generated on the aircraft surface 30 created by the heat-conducting tape 2, a temperature sensor, such as one or more thermocouples 32 of known types, may be included in one or more areas of the heat-conducting tape 2. Temperature sensors other than thermocouples may be used in the invention and these are well known to those skilled in the art. In the embodiment of the invention illustrated in FIG. 6, a bondable foil thermocouple 32 is incorporated into the heat-conducting tape at an outer surface of the outer heat-conducting layer and thermocouple control wires 34 may be routed with the electrical wires to a control system (see below). Temperature sensors can also be bonded within the heat-conducting tape (not shown). The temperature sensor is ideally thin and flat and can sense temperatures up to 150° C. A suitable thermocouple sensor for use in the invention is a self-adhesive Omega iron/constantan thermal couple (Omega Engineering, Inc., Stamford, Conn.).

Figure 7:
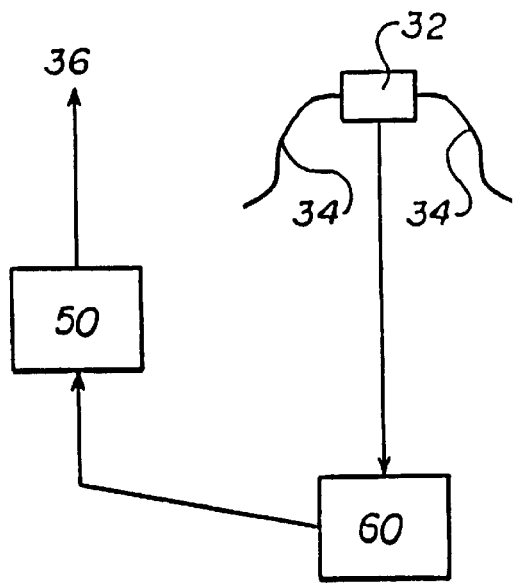
FIG. 7 is a schematic illustration of a power source and a programmable power control electronically connected to the flexible expanded graphite layer of the heat-conducting tape and a temperature sensor, respectively.

In order to selectively control the temperature of a surface to which the heat-conducting tape is applied, the flexible expanded graphite layer is connected to a source of electrical energy 50. For example, as illustrated in FIGS. 6 and 7 the flexible expanded graphite layer 20 is connected to the power source 50 using an edge connector or bus bar 40 and wiring system 36. The pliable wiring and bus arrangement connects the flexible expanded graphite layer to a main grid (not shown). Another edge connector or bus bar 38 is riveted to the metal aircraft section to provide a ground for the electrical circuit. Thus, the flexible expanded graphite foil layer is preferably connected to the power source by a single set of two electrical terminals. A current is transmitted through the foil by establishing a voltage differential between the terminals, resulting in heating of the foil.

The power source 50 may be one of several types on the aircraft, as is known to those skilled in the art. Light aircraft may be fitted with a 150 ampere to 200 ampere alternator producing 40 to 60 volts, without a significant weight penalty. Suitable alternators are available from EGC enterprises, inc., Chardon, Ohio. These alternators produce 150 amps at 50 volts and the voltage is selectable. Tests of the heat-conducting tape of the present invention have determined that an alternator having 3 to 35 volts available can provide a flexible expanded graphite foil heater producing 2 to 15 watts/in$^2$.

In the first embodiment of the invention, the temperature of the aircraft surface may be controlled by varying the voltage applied to the flexible expanded graphite layer of the heat-conducting tape over a fixed or varied amount of time or by providing a constant voltage for a series of fixed intervals or time. The amount of wattage supplied to the flexible expanded graphite layer can be varied in response to the outer surface temperature using a programmable power control logic system 60, such as a microprocessor, as illustrated in FIG. 7.

The aircraft may also comprise other sensors, known to those skilled in the art, for sensing icing conditions when ice-producing combinations of ambient temperature, humidity and dew point exist in the atmosphere encountered by the aircraft, the sensor(s) being programmed to signal the power source to provide electrical energy to the flexible expanded graphite foil layer of the heat-conducting tape when such icing conditions are sensed.

The invention is now described in detail with regard to a preferred embodiment of the invention employing the heat-conducting tape as a zoned de-icing system for aircraft surfaces including a leading edge. Special requirements for efficient zoned de-icing protection, published by the Federal Aviation Administration (FAA) in Aircraft Icing Handbook, Report #DOT/FAA/CT-88/8-2, m 2–3, include a high specific heat input applied over a short time period; immediate cessation of heating and rapid cooling of the surface after ice shedding occurs to greatly reduce runback ice; a minimum size of the heated area so that the heat is applied only under the ice and not dissipated to the airstream; a proper distribution of heat to produce clean shedding and to avoid runback icing, such that the melting of the ice bond occurs uniformly over the surface; prevention of anchorage of ice by bridging from one zone to another; and a cycle "off time" which is controlled to permit adequate ice accretion for the best shedding characteristics. The "off time" depends upon the thermal capacity of the shedding zone and the rate at which the surface cools to 32° F., as well as the icing rate, so that the ice thickness accumulated is the best for shedding when de-icing occurs. It is known from icing tunnel testing that thermal ice protection systems must be on before entering icing conditions, due to the "bridging" characteristics of ice formation and the amount of energy required to remove ice which has already formed on a structural member. It will be appreciated from the following description, that each of these special requirements is met or exceeded by the zoned de-icing system of the invention.

Figure 8:
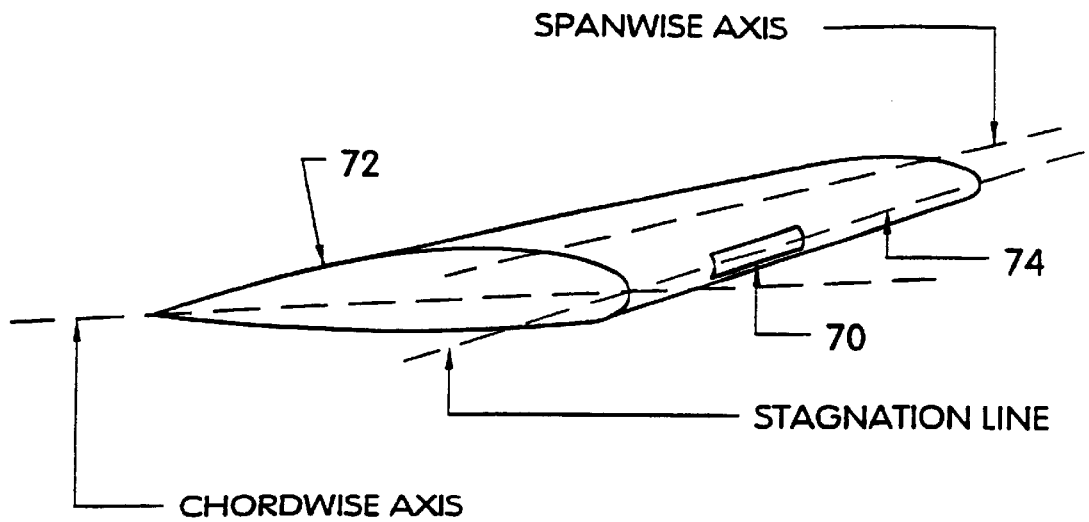
FIG. 8 is an electrothermal de-icer according to the prior art mounted on a structural member in the form of a wing.

As illustrated in FIG. 8, an electrothermal de-icer 70 according to prior art is shown mounted on a structural member 72 in the form of a wing. As is known, the structural member 72 includes a chordwise axis and a spanwise axis. During flight, the airflow impinges on a leading edge 74 of the structural member 72 and, when icing conditions are encountered, a number of icing stagnation points can develop, forming an ice stagnation line or axis, the position of which varies with the angle of attack of the leading edge during flight.

Figure 9:
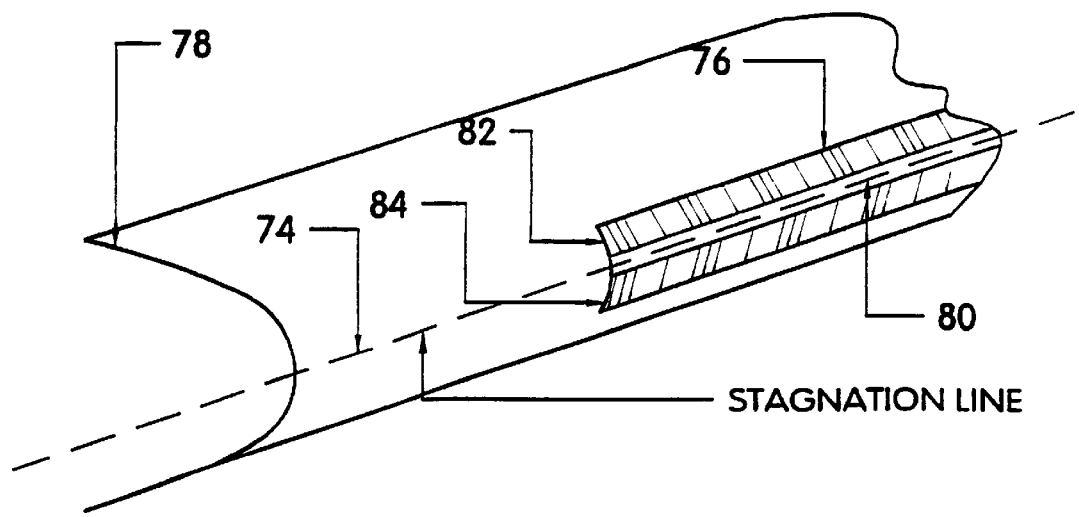
FIG. 9 is a schematic illustration of the heat-conducting tape of the zoned electrothermal de-icing system embodiment of the invention, bonded to the leading edge of an aircraft structure, such as a wing.

In the zoned electrothermal de-icing system embodiment of the present invention, a heat-conducting tape 76 is bonded to the leading edge 74 of an aircraft structure such as a wing 78, as illustrated in FIG. 9. The heat-conducting tape comprises at least two layers (not shown) laminated to each other under heat and pressure, i.e., the outer heat-conducting layer described above, and the non-metallic electrically conductive layer consisting of flexible expanded graphite foil. However, as described below, in this embodiment the flexible expanded graphite foil does not have a uniform thickness. Otherwise, the heat-conducting tape 76 is the same as that illustrated in FIGS. 4 and 5, and the bonding of the tape to the aircraft structure is the same as that illustrated in FIG. 6, including the insulating layer, the thermocouple(s), electrical contacts and connection to a power supply.

The heat-conducting tape may further comprise an additional outer erosion-resistant layer covering the outer heat-conducting layer, such as a layer of titanium, nickel, aluminum, stainless steel, and alloys thereof. Such erosion-resistant layers are known in the art.

In the zoned de-icing system embodiment illustrated in FIG. 9, the heat-conducting tape 76 comprises a first area that forms a parting strip 80 having a length disposed spanwise along the leading edge 74 of the structure and having a width sufficient to accommodate a change in the position of the ice stagnation line. The heat-conducting tape 76 further comprises a second area disposed spanwise above and aft of the parting strip 80 forming a first ice accumulation and shedding zone 82, and a third area disposed spanwise below and aft of the parting strip 80, forming a second ice accumulation and shedding zone 84. As described in detail below, the thickness of the flexible expanded graphite foil in the parting strip is always greater than the thickness of the graphite foil in each of the ice accumulation and shedding zones. When a predetermined amount of electric current is transmitted continuously through the tape, the outer surface of the heat-conducting outer layer at the parting strip is heated continuously to a temperature above 32° F. to maintain a continuous ice-free (running wet) condition. At intermittent intervals, an increased electric current is applied to the tape to raise the temperature of the outer surface of the heat-conducting outer layer at the spanwise ice accumulation and shedding zones above 32° F. to melt or loosen accumulated runback ice, which is then aerodynamically removed from the structural member by the airstream passing over the aircraft or by centrifugal forces when the aircraft structure is a propeller or rotor blade.

Figure 10:
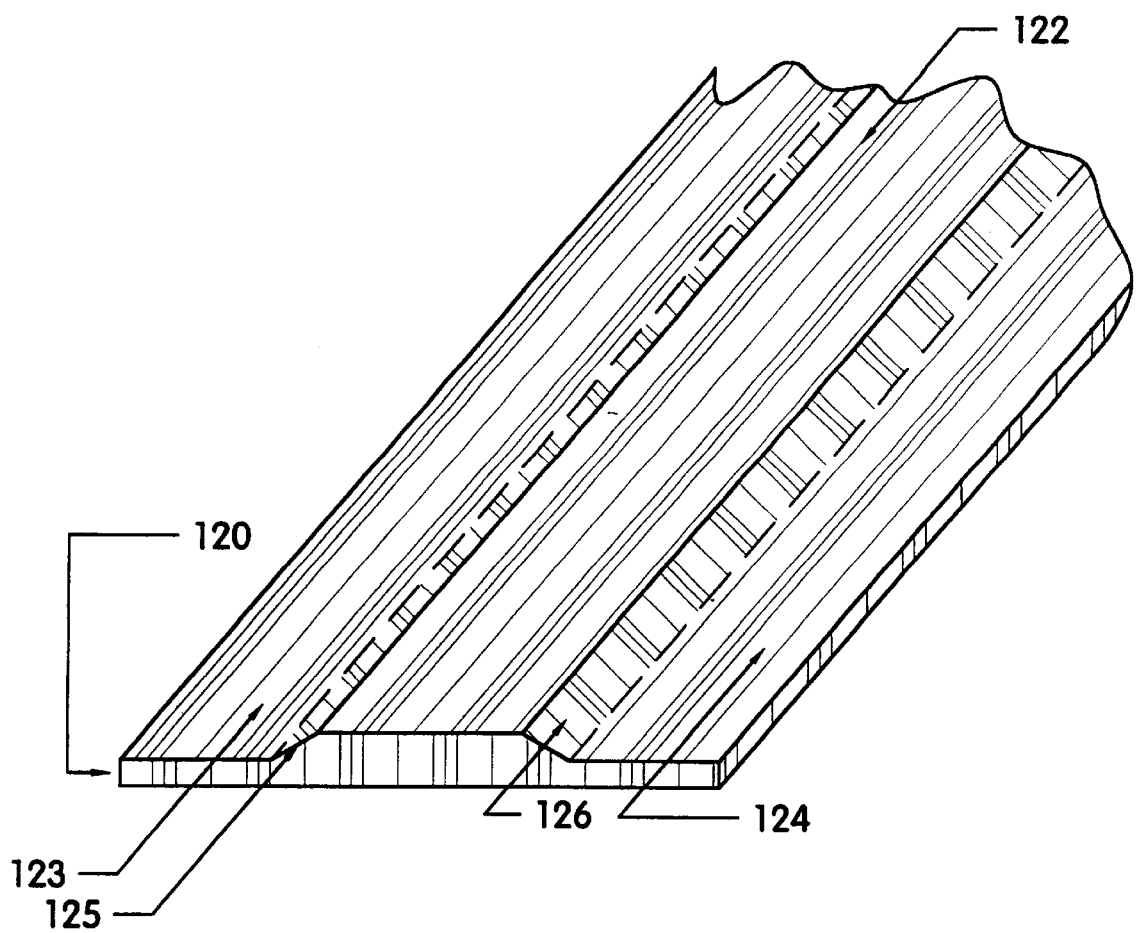
FIG. 10 is a schematic illustration of one embodiment of the flexible expanded graphite foil layer of the heat-conducting tape of the de-icing system embodiment.
Figure 11:
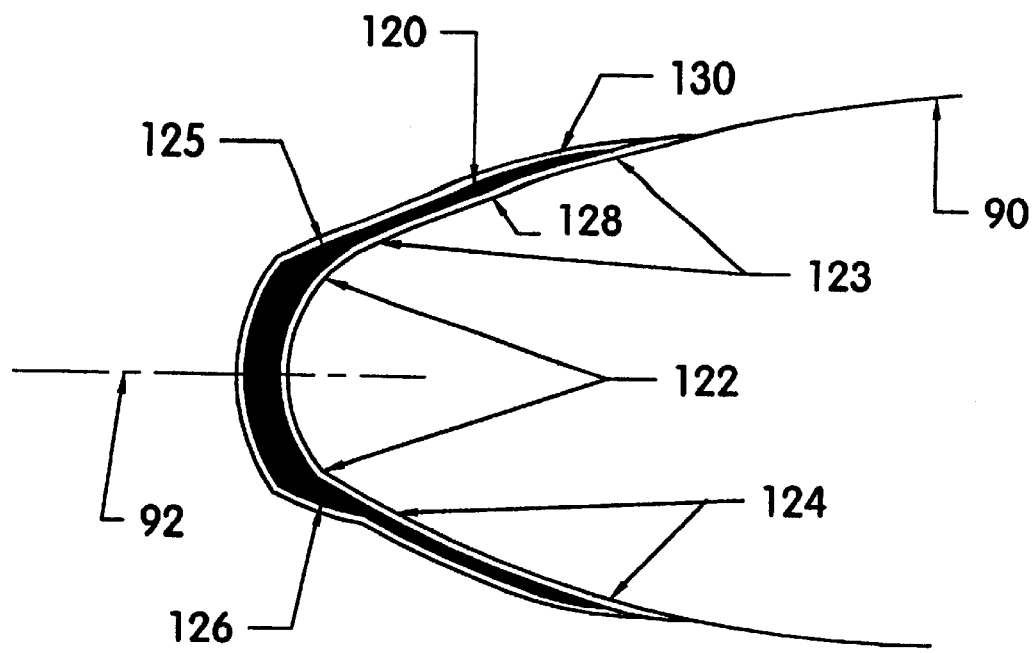
FIG. 11 is a schematic cross-sectional view of the heat-conducting tape of FIG. 10, bonded to the leading edge of a wing.
Figure 12:
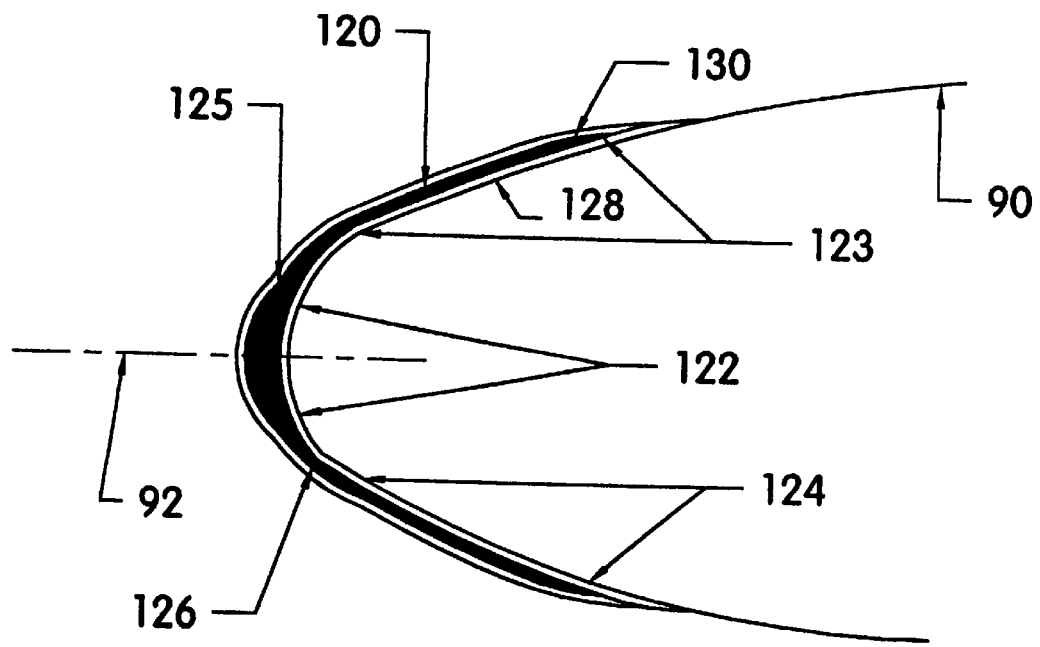
FIG. 12 is a schematic cross-sectional view of another embodiment of the heat-conducting tape of FIG. 10, bonded to the leading edge of a wing.

One embodiment of the flexible expanded graphite foil layer of the heat-conducting tape is illustrated in FIG. 10 and in cross-section on the leading edge of a wing 90 in FIGS. 11 and 12. In this embodiment, the flexible expanded graphite foil 120 is a monolithic, continuous structure which is shaped or "sculptured" to form a first thickness in the parting strip 122, a second thickness in the first ice accumulation and shedding zone 123, and a third thickness in the second ice accumulation and shedding zone 124, wherein the thickness of the foil sheet in the parting strip 122 is greater than the thickness of the foil in each of the first or the second ice accumulation and shedding zones. Preferably, the continuous foil sheet comprises a decreasing gradient of thicknesses 125 and 126 between the parting strip 122 and the first ice accumulation and shedding zone 123 and between the parting strip 122 and the second ice accumulation and shedding zone 124, respectively. The decreasing gradient of thicknesses may be shaped to form an angle or a series of "steps", as illustrated in FIGS. 10 and 11, or may be smoothly contoured, as illustrated in FIG. 12. Calculations of the thicknesses of the foil in the decreasing thickness gradients represented by the angle, steps or smooth contour are discussed below. The flexible expanded graphite foil layer 120 is disposed between the insulating layer 128, which is bonded to the outer surface of the wing 90, and the outer heat-conducting layer 130. In each of FIGS. 11, 12 and FIGS. 14 and 16 below, the ice stagnation line 92 is indicated as a broken horizontal line.

Figure 13:
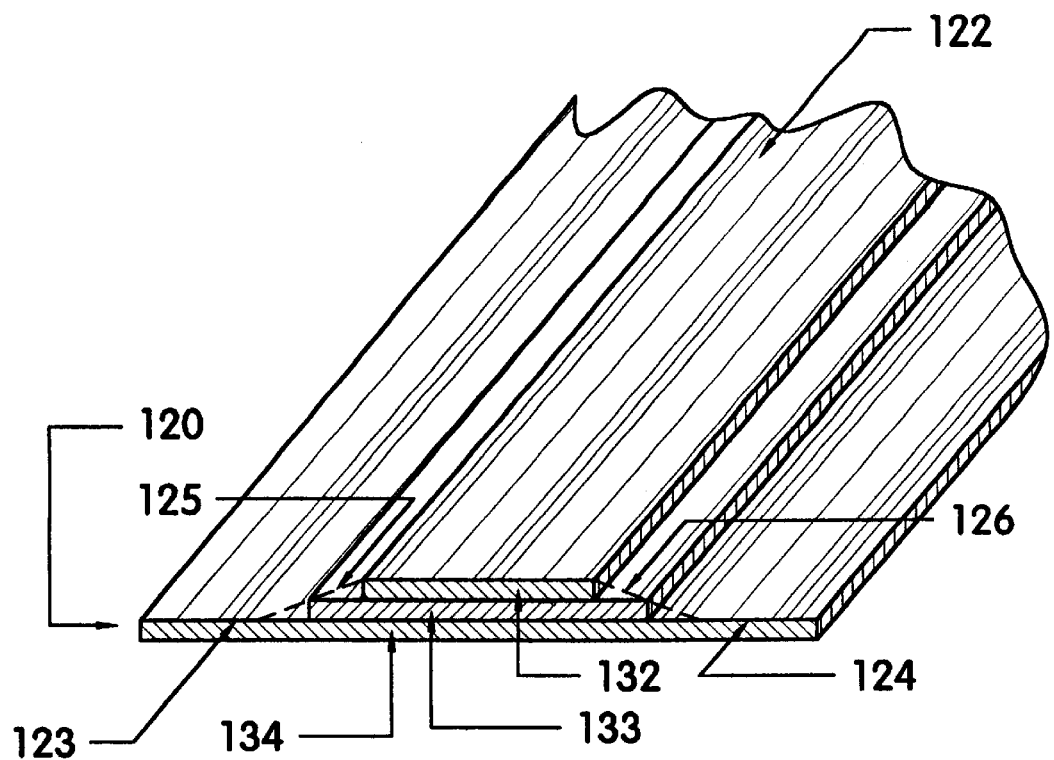
FIG. 13 is a schematic illustration of another embodiment of the flexible expanded graphite foil layer of the heat-conducting tape of the de-icing system embodiment.
Figure 14:
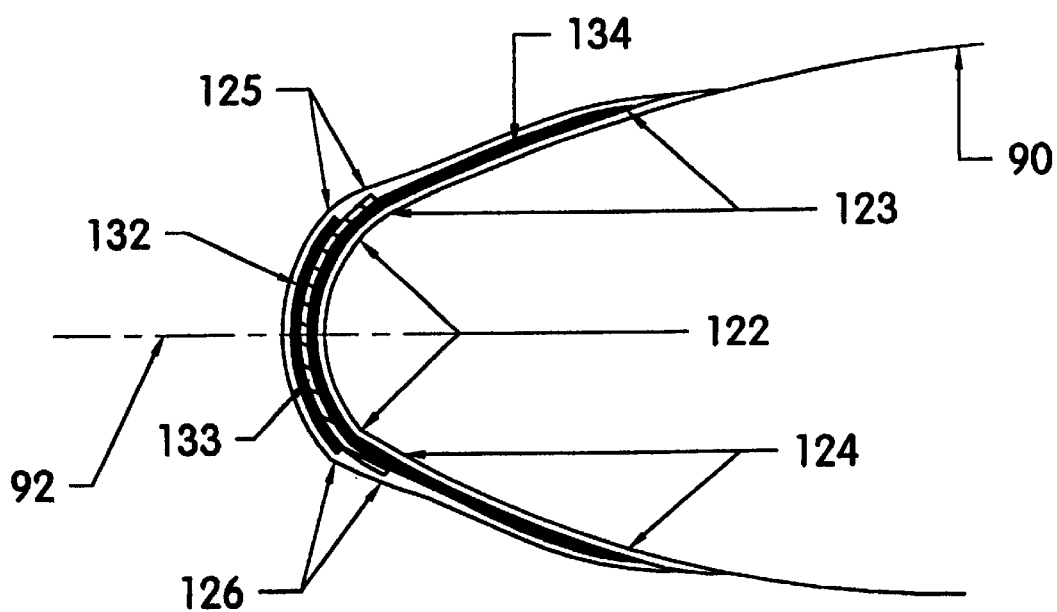
FIG. 14 is a schematic cross-sectional view of the heat-conducting tape of FIG. 13, bonded to the leading edge of a wing.

In another embodiment of the flexible expanded graphite foil layer of the zoned de-icing system embodiment illustrated in FIG. 13 and in cross-section on the leading edge of a wing 90 in FIG. 14, the parting strip 122 comprises at least two layered flexible expanded graphite foil sheets 132 and 133, having thicknesses that are the same as or different from each other. In this embodiment, bottom layer 134 of foil may have a thickness that is the same as or different from the thickness of the foil in the ice accumulation and shedding areas 123 and 124. The layers are shaped to provide a decreasing gradient of thicknesses 125 and 126 between the parting strip 122 and the first ice accumulation and shedding zone 123 and between the parting strip 122 and the second ice accumulation and shedding zone 124, respectively.

Figure 15:
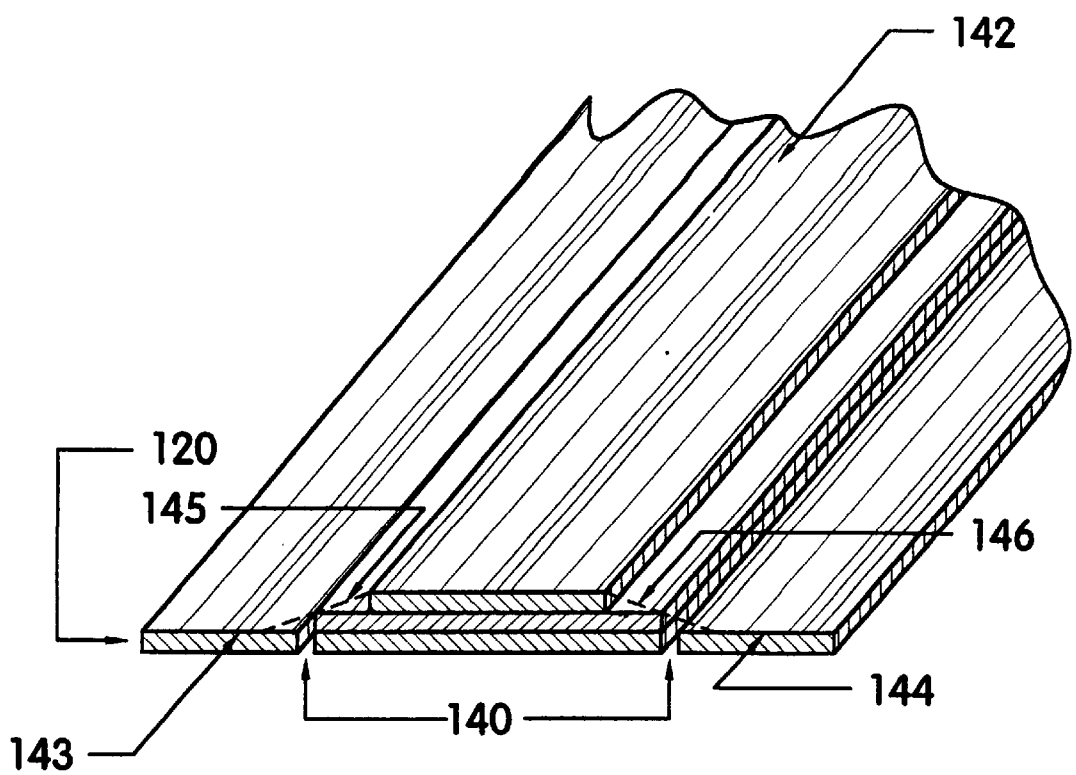
FIG. 15 is a schematic illustration of another embodiment of the flexible expanded graphite foil layer of the heat-conducting tape of the de-icing system embodiment.
Figure 16:
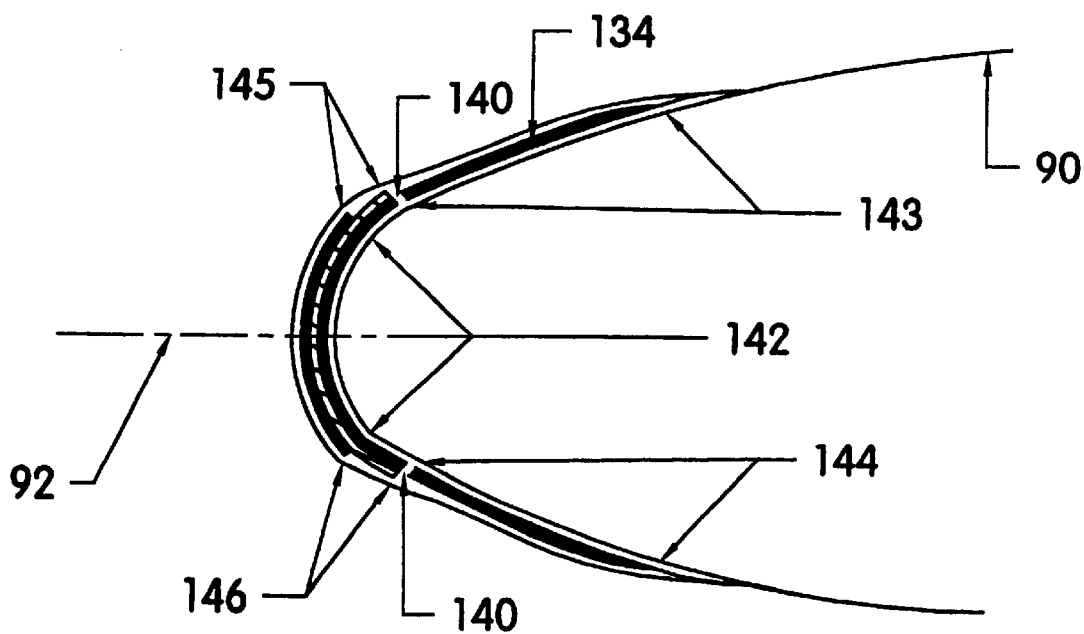
FIG. 16 is a schematic cross-sectional view of the heat-conducting tape of FIG. 15, bonded to the leading edge of a wing.

In another embodiment of the flexible expanded graphite foil layer 120 of the zoned de-icing system embodiment illustrated in FIG. 15 and in cross-section on the leading edge of a wing 90 in FIG. 16, the foil comprises at least two separate sections selected from the group consisting of a parting strip section 142, a first ice accumulation and shedding section 143, and a second ice accumulation and shedding section 144, wherein the first and/or the second ice accumulation and shedding sections are separated from the parting strip section 142 by a gap 140 of no greater than 60 mils. A gap of this dimension is acceptable because it allows heat transfer between the separated sections, and it allows the three sections of the foil to be connected to a power supply by a single set of two electric terminals. In another embodiment which may be desirable for testing purposes, each of the three sections of the foil may have its own set of two electric terminals for connection to the power supply.

In the illustrated embodiment of FIGS. 15 and 16, both the first and second ice accumulation and shedding sections are separated from the parting strip section; however, in another embodiment, only one ice accumulation and shedding section may be separated from the parting strip section. The parting strip section 142, or at least one of the ice accumulation and shedding zone sections 143 and 144, respectively, may comprise a decreasing gradient of thicknesses 145 or 146 between the parting strip and the first ice accumulation and shedding zone or between the parting strip and the second ice accumulation and shedding zone, respectively.

Figure 17:
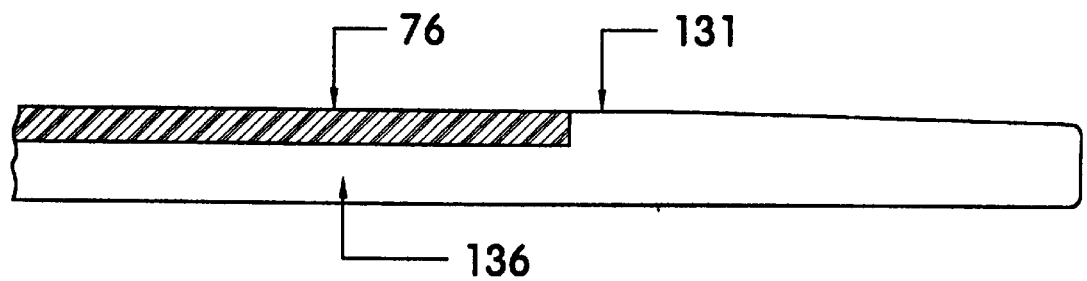
FIG. 17 is a schematic illustration of an embodiment of the invention wherein the heat-conducting tape is bonded to the leading edge of a helicopter rotor blade or a propeller blade.
Figure 18:
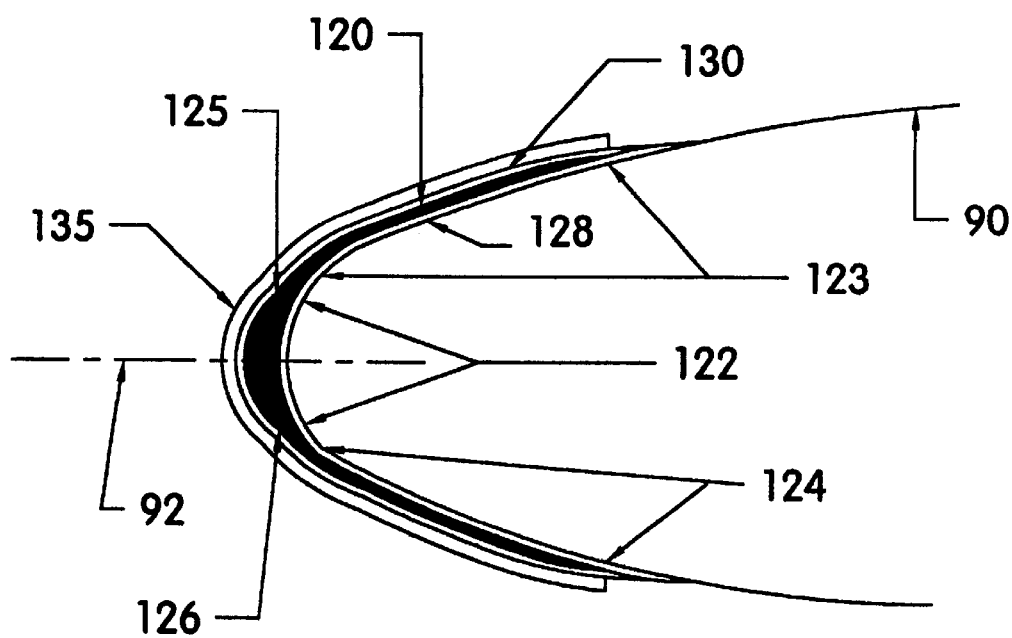
FIG. 18 is a schematic cross-sectional view of an embodiment of the heat-conducting tape comprising an outer erosion-resistant layer, bonded to the leading edge of a helicopter rotor blade or a propeller blade.

In another embodiment of the zoned de-icing system, the heat-conducting tape 76 is bonded to a leading edge 131 of a helicopter rotor blade or a propeller blade 136, as illustrated in FIG. 17. Because of the speed of rotation of the blades during flight, and the centrifugal forces produced, these blades are more susceptible to erosion by the force of the impinging water droplets. Therefore, it is preferred that, in this embodiment illustrated in FIG. 18, an additional outer erosion-resistant layer 135 is bonded to the outer heat-conducting layer, such as by an adhesive. Preferably, the outer erosion-resistant layer is selected from titanium, nickel, aluminum, stainless steel, and alloys thereof. It is to be appreciated that this additional outer erosion-resistant layer may be present when any of the embodiments of the heat-conducting tape illustrated in FIGS. 10 through 16 is employed on a helicopter rotor blade or a propeller blade.

Any of the embodiments of the tape described above may be produced by calendering, such as that described in U.S. Pat. No. 5,198,063, or by vertical pressing, as known to one of ordinary skill in the art.

To determine the desired thicknesses of the flexible expanded graphite foil in the parting zone and in the ice accumulation and shedding zones, the electrical resistance of the foil must be considered. It is known that the electrical resistivity and resistance of flexible expanded graphite along the length and width of the foil varies with both the thickness and the density of the foil. Therefore, the thickness of flexible expanded graphite foil layer having a known resistivity, density, length (L) and width (W) may be calculated, as follows, where A is the cross-sectional area (W×thickness, T) of the foil:

$$\frac{L}{A} \times \text{resistivity} = \text{resistance } (R) \quad (1)$$

$$\text{Power(watts)} = I^2(\text{amps})R \quad (2)$$

$$\text{Power} = I\,E(\text{voltage}) \quad (3)$$

$$I = \frac{E}{R} \quad \text{and} \quad R = \frac{E}{I} \quad (4)$$

The value of R may then be used in equation (1) to determine the thickness of the foil by calculating the cross-sectional area A.

For example, a flexible expanded graphite foil has a density of 90 lbs./ft.$^3$, a resistivity of $3.1 \times 10^{-4}$ ohm-in., a length of 60 inches and a parting strip width of one inch. From exemplary testing data, such as that described below, it may be determined that Grafoil® having an area of 60 in.$^2$ requires 5 watts/in.$^2$ to maintain a temperature in the parting strip above 32° F., e.g., about 34° F. to about 37° F. The total wattage necessary is 300 watts. Employing power from a high output alternator, such as that described above, an exemplary 25 volt output is selected. From the above equations, $$300 = I\,E$$

where

E=25 volts

I=12 amps $$300 = 12^2 R$$

R=2.08 ohms $$\frac{60}{A} \times 3.1 \times 10^{-4} = 2.08$$

$$A = \frac{60 \times 3.1 \times 10^{-4}}{2.08} = 0.009 \text{ in}^2$$

A=W×T $$T = \frac{A}{W} = 0.009 \text{ inches}$$

The above calculations can also be used to determine the thickness of the flexible expanded graphite foil layer in the ice accumulation and shedding zones. The calculations assume a uniform thickness of the foil, excluding decreasing thickness gradients. In the embodiment of the invention illustrated in FIG. 12, wherein the flexible expanded graphite layer is contoured, similar calculations can be used to determine optimum thickness gradient using calculus, as known to one of ordinary skill in the art.

Figure 19:
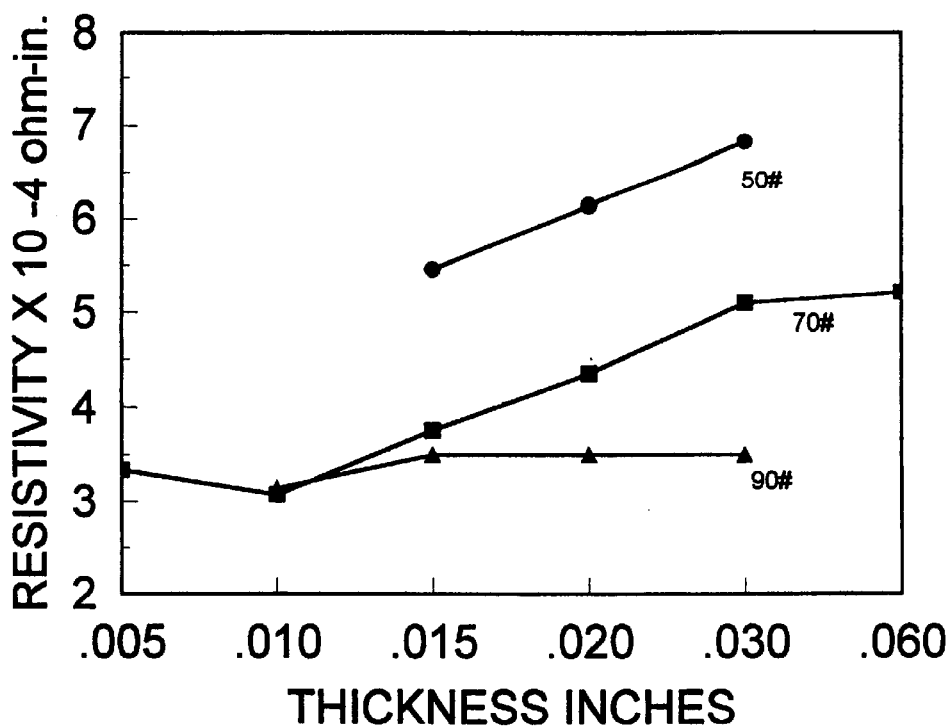
FIG. 19 is a graph of the resistivity of Grafoil® Brand Flexible Expanded Graphite versus density.
Figure 20:
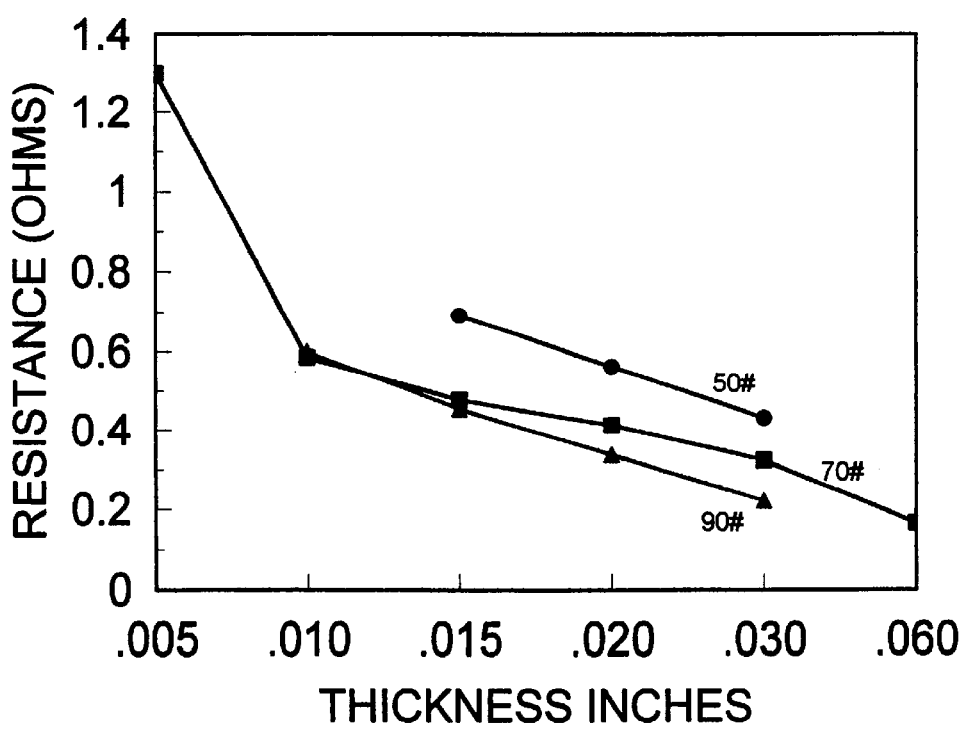
FIG. 20 is a graph of the resistance of Grafoil® versus thickness.
Figure 21:
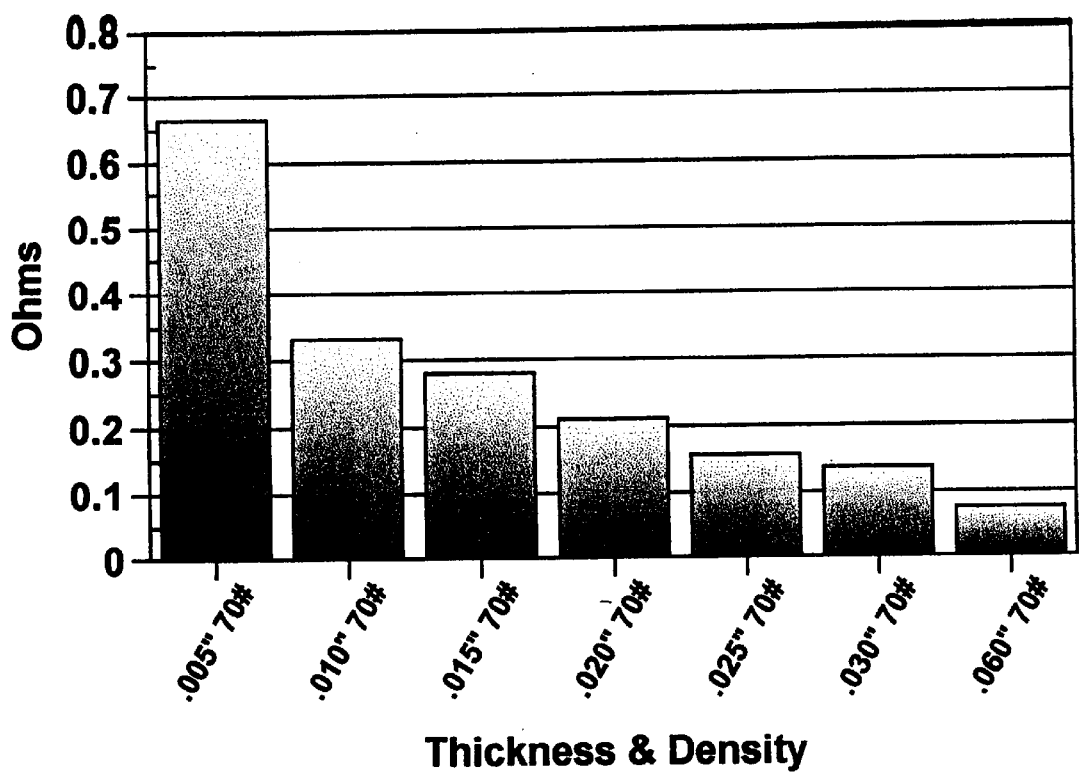
FIG. 21 is a histogram illustrating the resistance of Grafoil® versus thickness and density.

As illustrated in FIGS. 19 and 20, 1" wide×19" long test strips of Grafoil® Brand Flexible Expanded Graphite of 50 (50#), 70 (70#) and 90 (90#) lbs./ft.$^3$ density and varying thicknesses were subjected to a selected power from a DC power supply providing 2 to 6 volts and 4 to 17 amperes. The values for the electrical resistivity and resistance of the Grafoil® were calculated by known methods, using the equations described above and voltmeter and ammeter measurements. As illustrated in FIG. 19, the resistivity of the foil having a density of 90 lbs./ft.$^3$ was substantially constant at between about 3.1 and about $3.4 \times 10^{-4}$ ohm-in. over a range of thicknesses of at least 0.005 inches to 0.030 inches. The resistivity of the 70 lbs./ft.$^3$ foil was also in the range of about 3.1 to about $3.7 \times 10^{-4}$ ohm-in. at thicknesses of about 0.005 to about 0.015 inches. As is apparent from the foregoing calculations for obtaining thickness values for each of the parting strip and ice accumulation and shedding zones, it is preferred that the resistivity of the flexible expanded graphite comprises a substantially constant value, such as about $3.1 \times 10^{-4}$ ohm-in. As illustrated in FIG. 20, the resistance of the flexible expanded graphite foil along its length and width decreases with the thickness and the density of the foil. Foil having a density of 70 or 90 lbs./ft.$^3$ showed a lower resistance over all thicknesses than the 50 lbs./ft.$^3$ foil, with the 90 lbs./ft.$^3$ foil showing the greatest decrease in resistance with increasing thickness. The resistance of various thicknesses of Grafoil® having a density of 70 lbs./ft.$^3$ and a resistivity of $3.1 \times 10^{-4}$ ohm-in. at various thickness is illustrated in FIG. 21. In view of the foregoing measurements of resistivity and resistance, the density of the flexible expanded graphite foil used for the zoned de-icing system embodiment of the invention may be about 50 to about 95 lbs./ft.$^3$, but is preferably about 70 to about 95 lbs./ft.$^3$, more preferably about 80 to about 95 lbs./ft.$^3$, especially about 90 to about 95 lbs./ft.$^3$.

Figure 24:
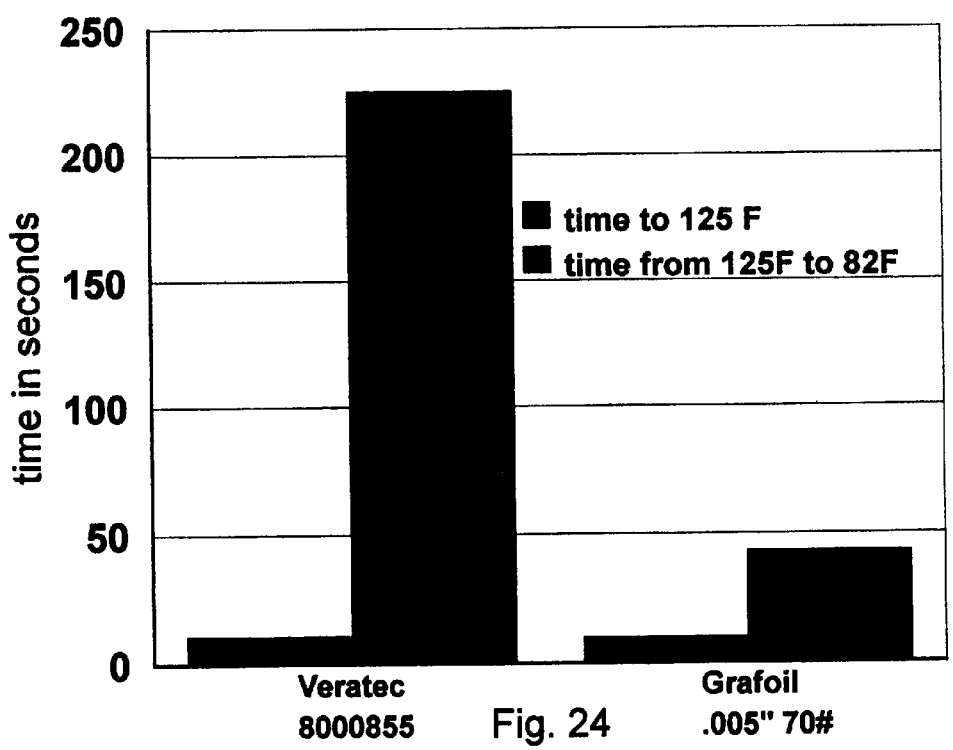
FIG. 24 is a histogram comparing the time to heat up and time to cool down of Grafoil® versus a Veratec material.
Figure 22:
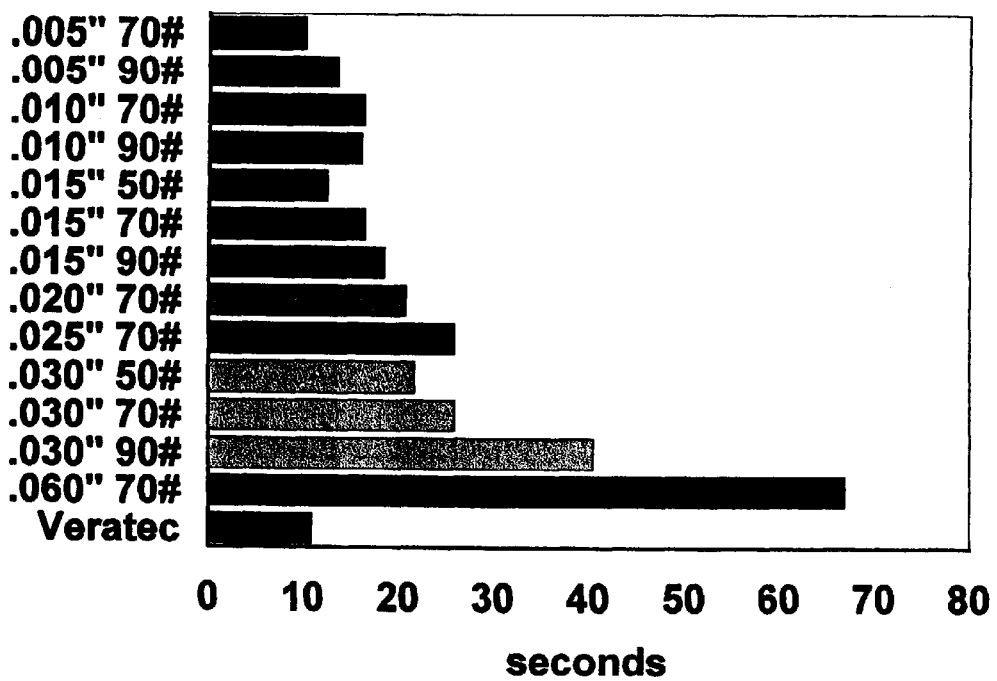
FIG. 22 is a histogram illustrating the time to heat Grafoil® of various thicknesses and densities to 125° F.
Figure 23:
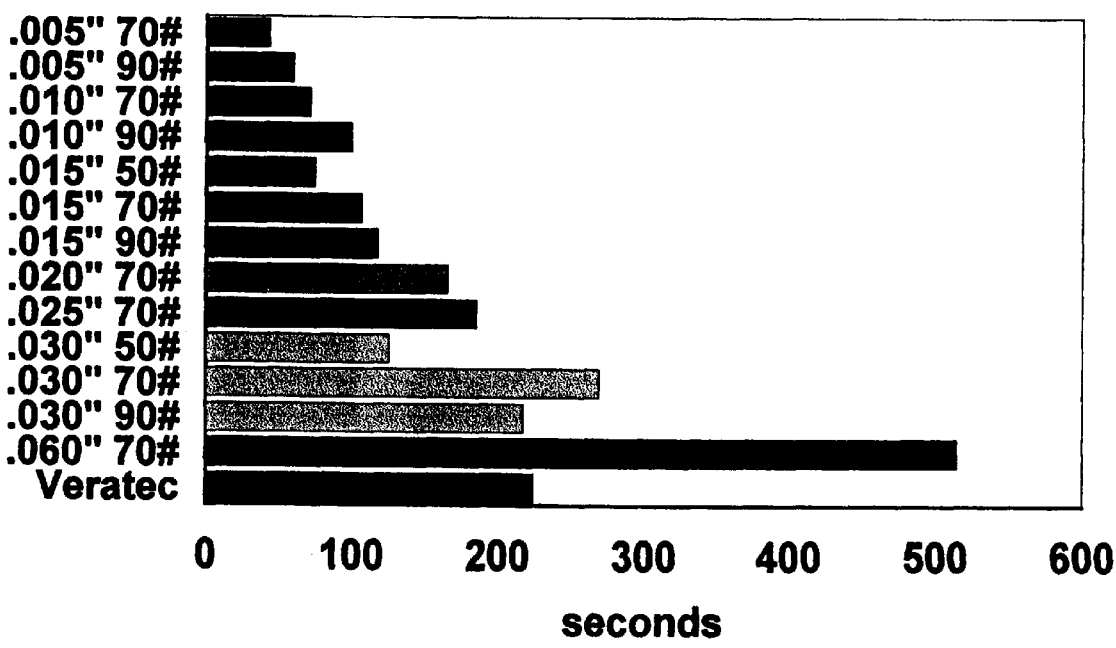
FIG. 23 is a histogram illustrating the time for Grafoil of various thickness and densities to cool down from 125° F. to 82° F.

The heat-up and cool-down times of the flexible expanded graphite foil used in the heat-conducting tape of the invention were compared to heat-up and cool-down times of the conductive ply of an electrothermal heating pad employing metal elements for aircraft de-icing disclosed in U.S. Pat. No. 5,344,696. The disclosed conductive ply comprises a mat of nickel-coated carbon fibers, VERATEC Grade Number 80000855, available from VERATEC, a division of International Paper Co., Walpole, Mass. Strips of the VERATEC mat (0.003 inches thick) or Grafoil® Brand Flexible Expanded Graphite of varying densities and thicknesses, measuring 2" wide×20" long were subjected to 20 watts (0.5 watts/in.$^2$) of power. The time to heat to 125° F. from ambient temperature (82° F.) in air, with no convection, was measured. When power was removed, the time to cool down from 125° F. to 82° F. was measured. As demonstrated by the data in FIGS. 22, 23 and 24, Grafoil® having a thickness of 0.005 inches and a density of 70 lbs./ft.$^3$ heats as quickly to 125° F. as 0.003 inch thick VERATEC, but cools down about five times faster. Moreover, Grafoil® having a thickness of 0.005 inches and a density of 90 lbs./ft.$^3$ heats almost as quickly as the VERATEC, but cools down about twice as quickly.

Figure 25:
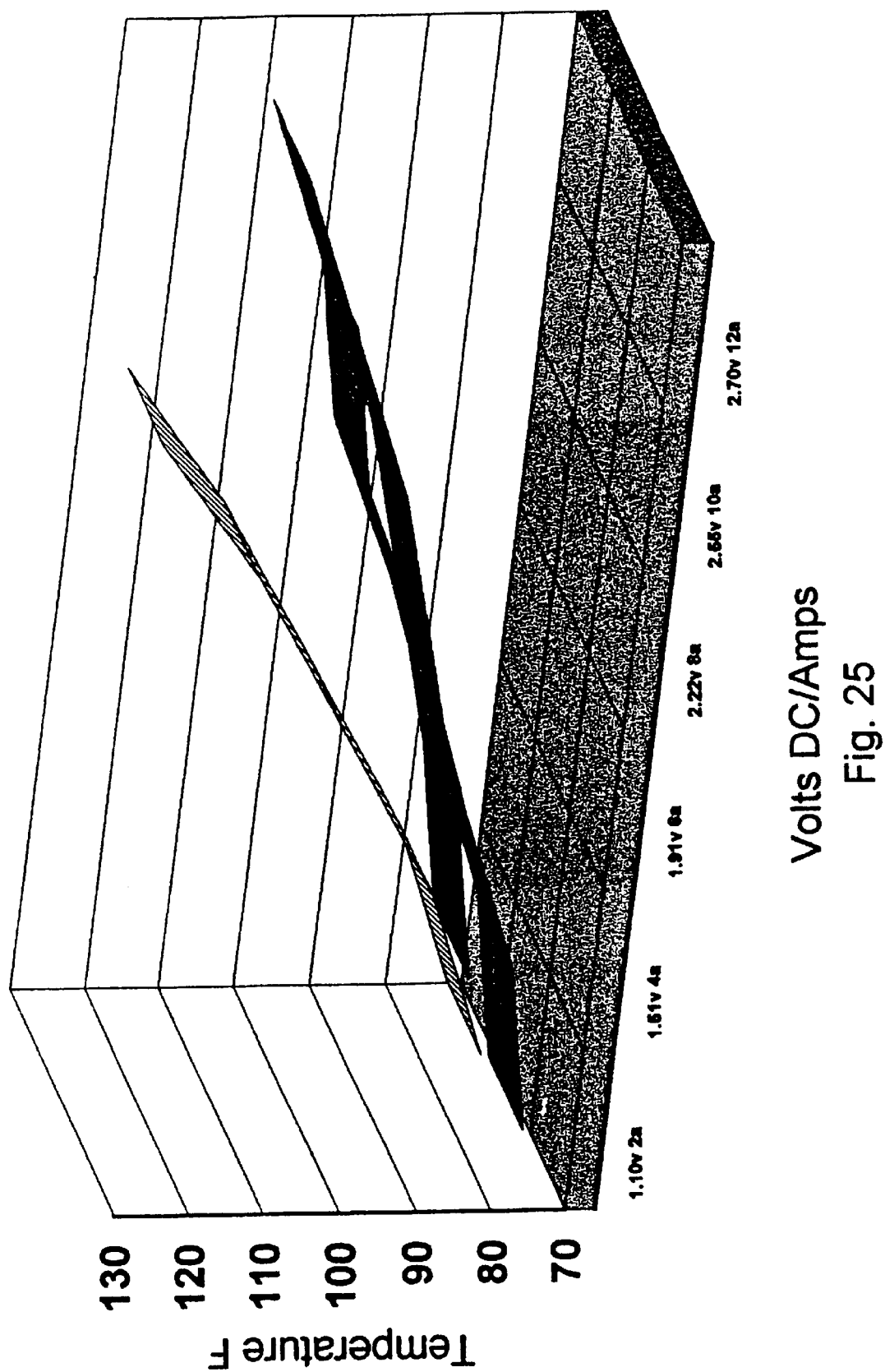
FIG. 25 is a three-dimensional schematic illustration of the power requirements to heat Grafoil® having different thicknesses bonded to a composite laminar flow wing from a Vantage® aircraft.

Preliminary bench tests were performed to determine the power requirements for heating Grafoil® having a density of 70 lbs./ft.$^3$ or 90 lbs./ft.$^3$ bonded to a composite laminar flow wing from a Vantage® aircraft (supplied by VisionAire Corporation, Ames, Iowa). The tape was divided into three 2" wide×20" long sections having different thicknesses simulating a parting strip area having a thickness of 0.020 inches, and each of two ice accumulation and shedding areas having a thickness of 0.005 inches. The tape was subjected to DC voltage at various amperages, and the temperature of the outer heat-conducting layer of the tape was measured with a thermocouple. The test was conducted at ambient temperature (75° F.) in air with no convection. The results of this test, illustrated in FIG. 25, show that for each of the given voltages and amperages, the thicker "parting strip" (checkered ribbon) was hotter than either of the two thinner ice accumulation and shedding areas (hatched ribbons). Moreover, at a power setting of less than 2.55 volts and 10 amps, the "parting strip" was about 20° F. hotter than the flanking areas. As the power setting increased to 2.78 volts and 12 amps, the difference in temperature widened to about 32° F.

Figure 26:
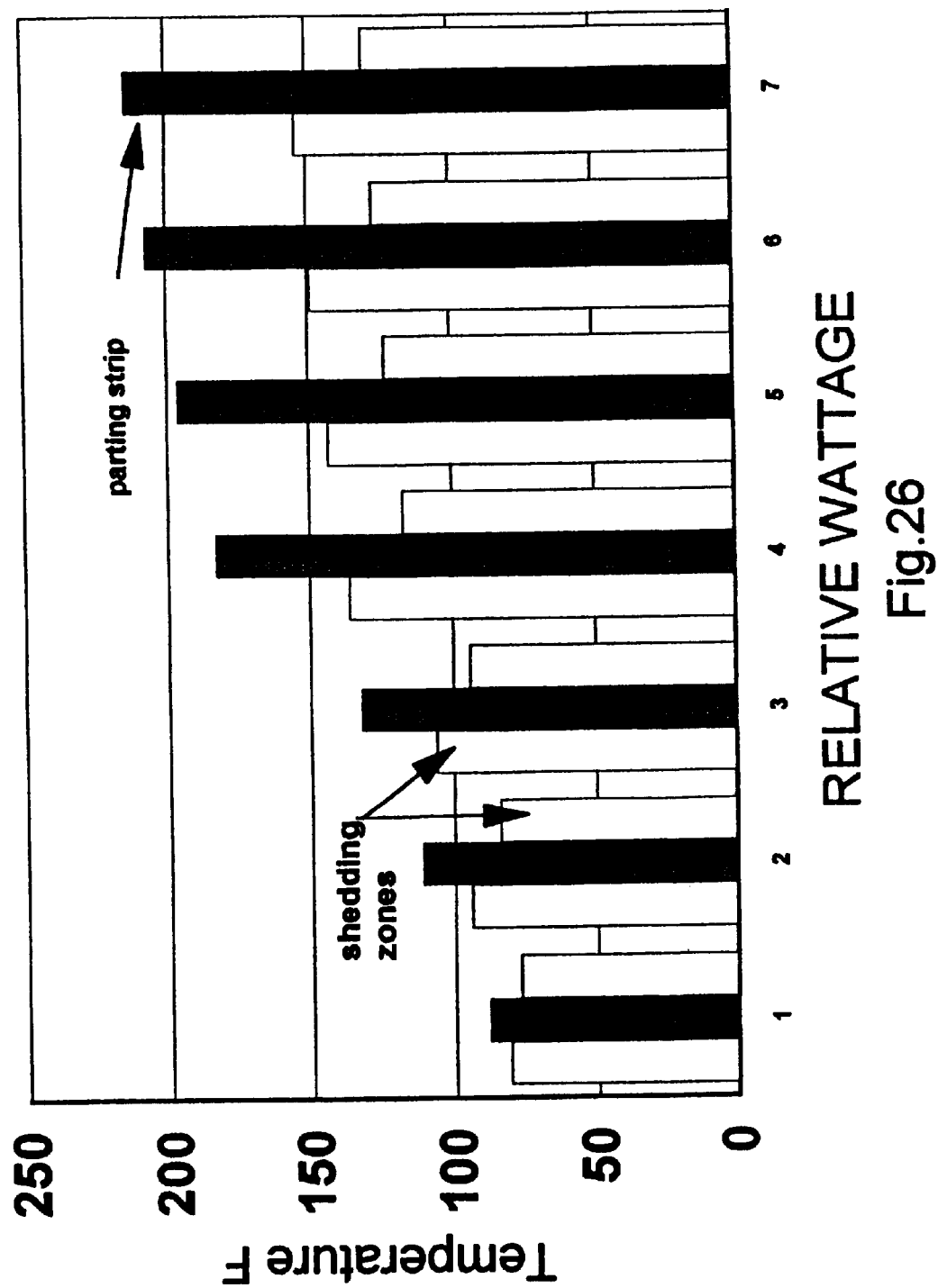
FIG. 26 is a histogram illustrating the heat transfer between in a simulated parting zone and ice accumulation and shedding zones, when the parting zone only was powered.
Figure 27:
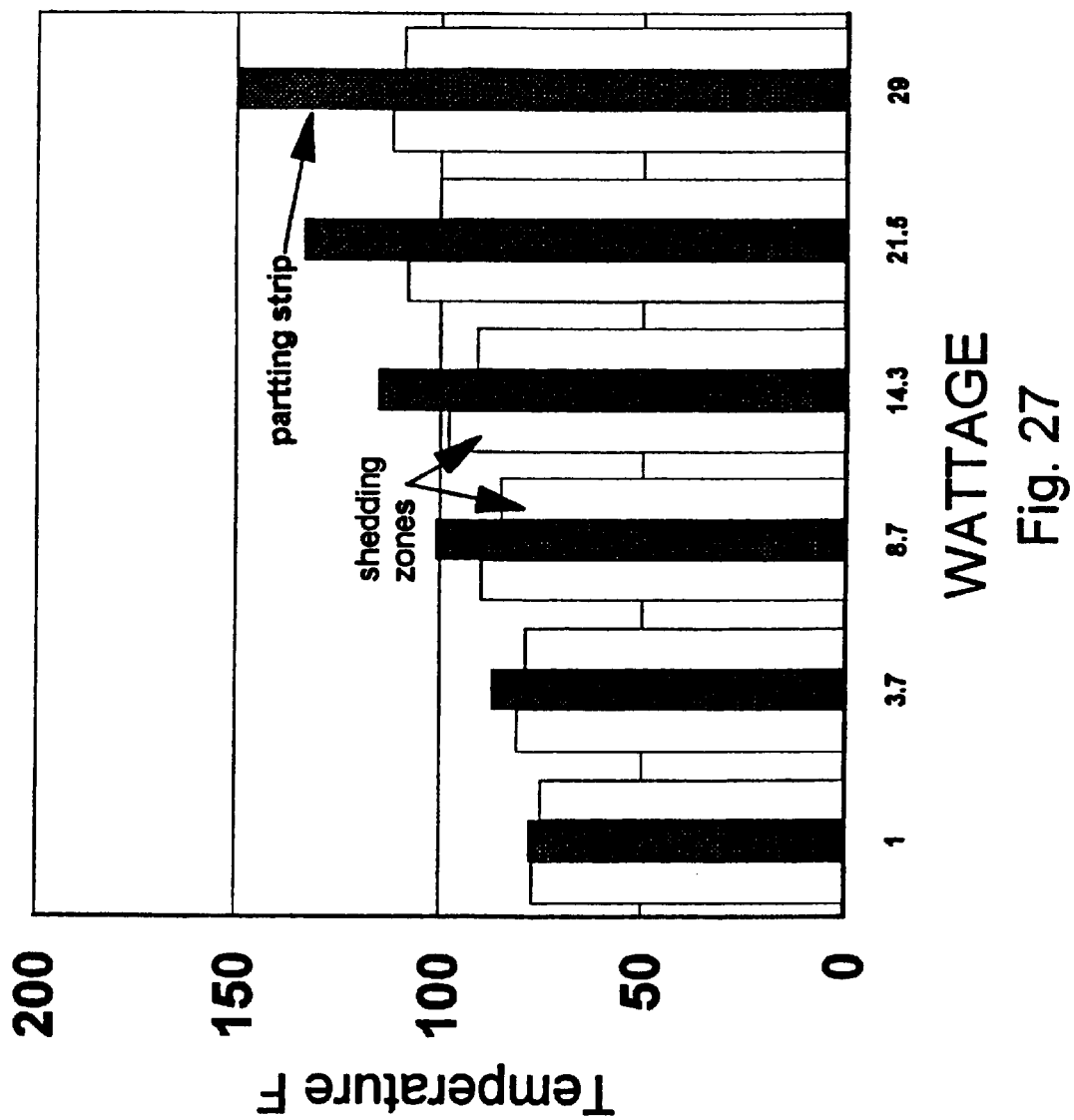
FIG. 27 is a histogram illustrating the temperatures of the simulated parting zone and ice accumulation and shedding zones, when all zones were powered.

A further bench test was conducted to determine the heat conducted from the parting strip zones to the ice accumulation and shedding zones. In this test, Grafoil® having a density of 90 lbs./ft.$^3$ was divided into three 2"×20" sections that were separately connected to electrical terminals. The sections were apposed to each other on the Vantage composite wing with a gap of no greater than 60 mils, with a parting strip section having a thickness of 0.020 inches along the leading edge, flanked by an ice accumulation and shedding zone section having a thickness of 0.005 inches on each side. Each section of the tape was separately connected to electrical terminals. The test was conducted at ambient temperature in air with zero convection. The data in FIG. 26 illustrate the heat transfer test with only the parting strip powered; whereas the data in FIG. 27 illustrate the heat transfer test with both the parting strip and the ice accumulation and shedding zones powered. At each wattage tested, there was significant heat transfer from the parting strip to each of the ice accumulation and shedding zone, when the parting strip only was powered. Moreover, when all zones are energized, minimal energy was required for achieving desired temperatures, such as during a short de-icing cycle.

Figure 28:
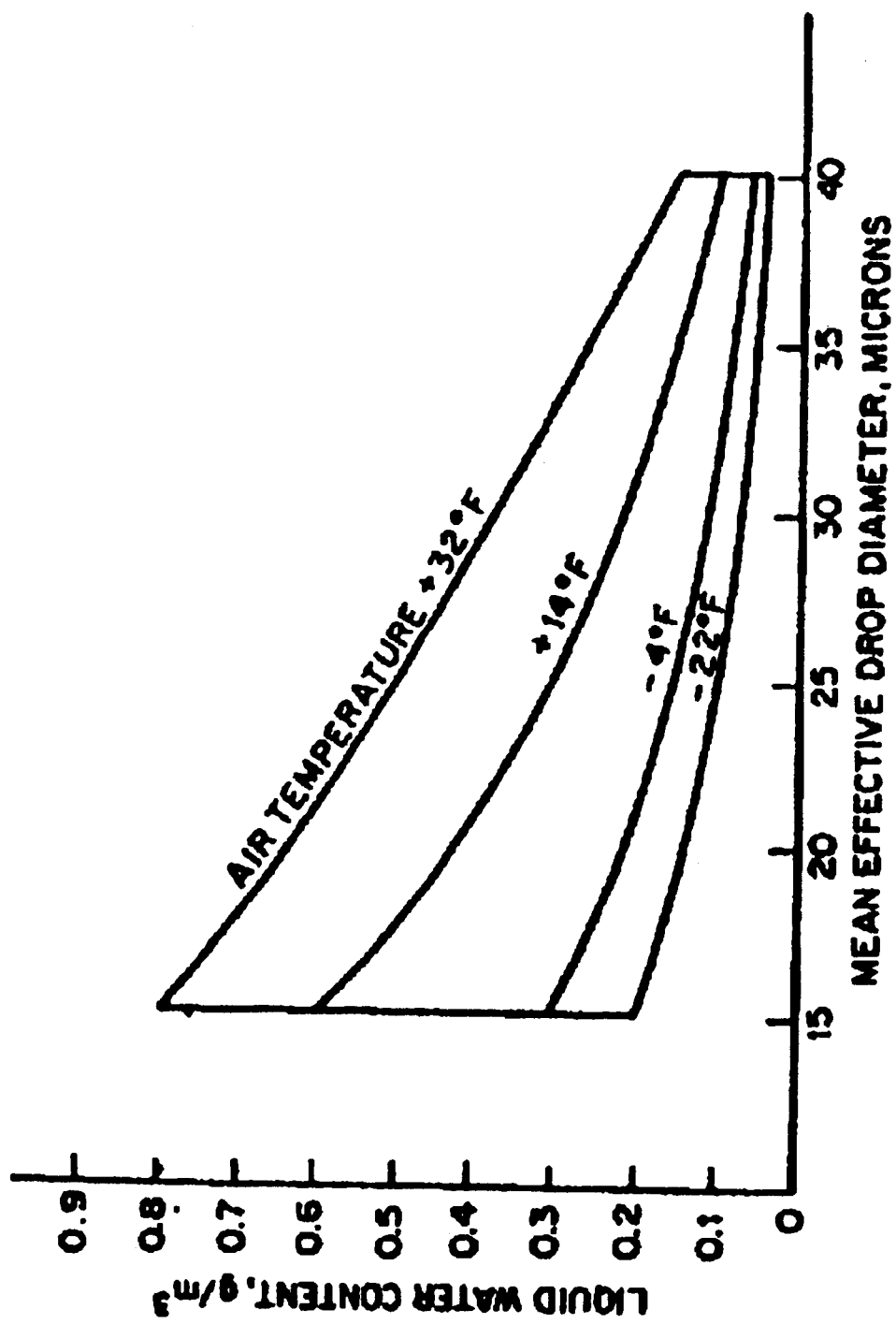
FIG. 28 is a figure reproduced from the Aircraft Icing Handbook, Report #DOT/FAA/CT-88/8-2 illustrating atmospheric icing design conditions for stratiform clouds.

Preliminary tests to determine the power requirements for heating the heat-conducting tape having various thicknesses of flexible expanded graphite foil, above 32° F. under various environmental conditions, were performed at the Icing Research Tunnel (IRT) at NASA Glenn Research Center, Cleveland, Ohio. Atmospheric icing conditions were simulated to fall within the FAA guidelines for aircraft de-ice testing (Aircraft Icing Handbook, Report #DOT/FAA/CT-88/8-2, Appendix C, FIG. 3-2, FAR 25 Atmospheric Icing Design Conditions—Stratiform Clouds). The conditions are for continuous (stratiform clouds) atmospheric icing conditions, with a pressure altitude range of sea level to 22,000 feet; a maximum vertical extent of 6500 feet; and a horizontal extent at a standard distance of 17.4 nautical miles. The published FIG. 3-2 is reproduced as FIG. 28. Environmental conditions in the IRT were selected to fall within approximately the middle of the illustrated envelope.

Figure 29:
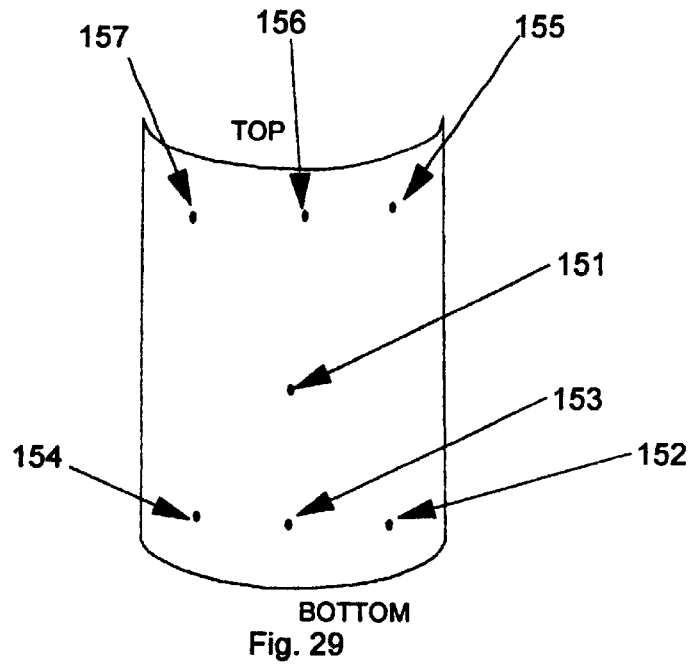
FIG. 29 is a schematic illustration of the location of seven thermocouples on the leading edge of a Cessna 182-R wing to which the heat-conducting tape was bonded.
Figure 30:
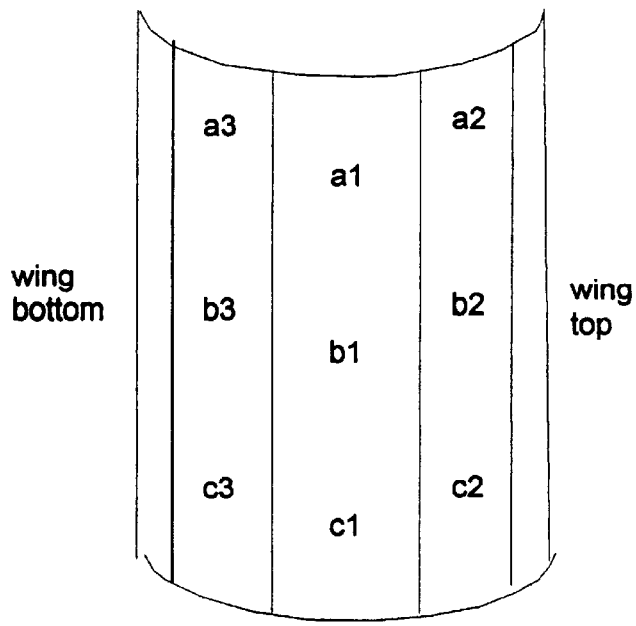
FIG. 30 is a schematic illustration of the location of six thermocouples on the leading edge of a Lancair IV wing to which the heat-conducting tape was bonded.

The heat-conducting tape comprised Grafoil® laminated to a layer of mineral filled polyurethane material (Staystik™) having a thickness of 0.003 inches. The tape was bonded with a rubber backing to one of two aircraft wing models, i.e., a Cessna 182-R wing or a Lancair IV carbon composite wing. For the Cessna wing, the tape was a single sheet, and the density of the Grafoil® was 70 lbs./ft.$^3$ For the Lancair wing, the tape was divided into three sections, as described below, and the density of the Grafoil® was 90 lbs./ft.$^3$ The location of the seven thermocouples on the leading edge of the Cessna 182-R wing and the six thermocouples (at arrow heads) on the Lancair IV wing are indicated in FIGS. 29 and 30, respectively. On the Cessna 182-R leading edge, temperature probes #3 and #6 (153 and 156, respectively) are located along the icing stagnation line; temperature probe #1 (151) is located inside the leading edge behind the aluminum; temperature probes #2 (152) and #3 (153) are located 2⅜ inches to the right of and 1⅜ inches to the left of the icing stagnation line, respectively, and 7 inches from the bottom of the wing section; and temperature probes #5 (155) and #7 (157) are located 2⅜ inches to the right of and 1¼ inches to the left of the icing stagnation line, respectively, and 7 inches from the top of the wing section. On the Lancair IV wing, sets of three thermocouples a1, b1, c1; a2, b2, c2; and a3, b3, c3 are located in parting strip zone 1, ice accumulation and shedding zone 2 and ice accumulation and shedding zone 3, respectively.

Figure 31:
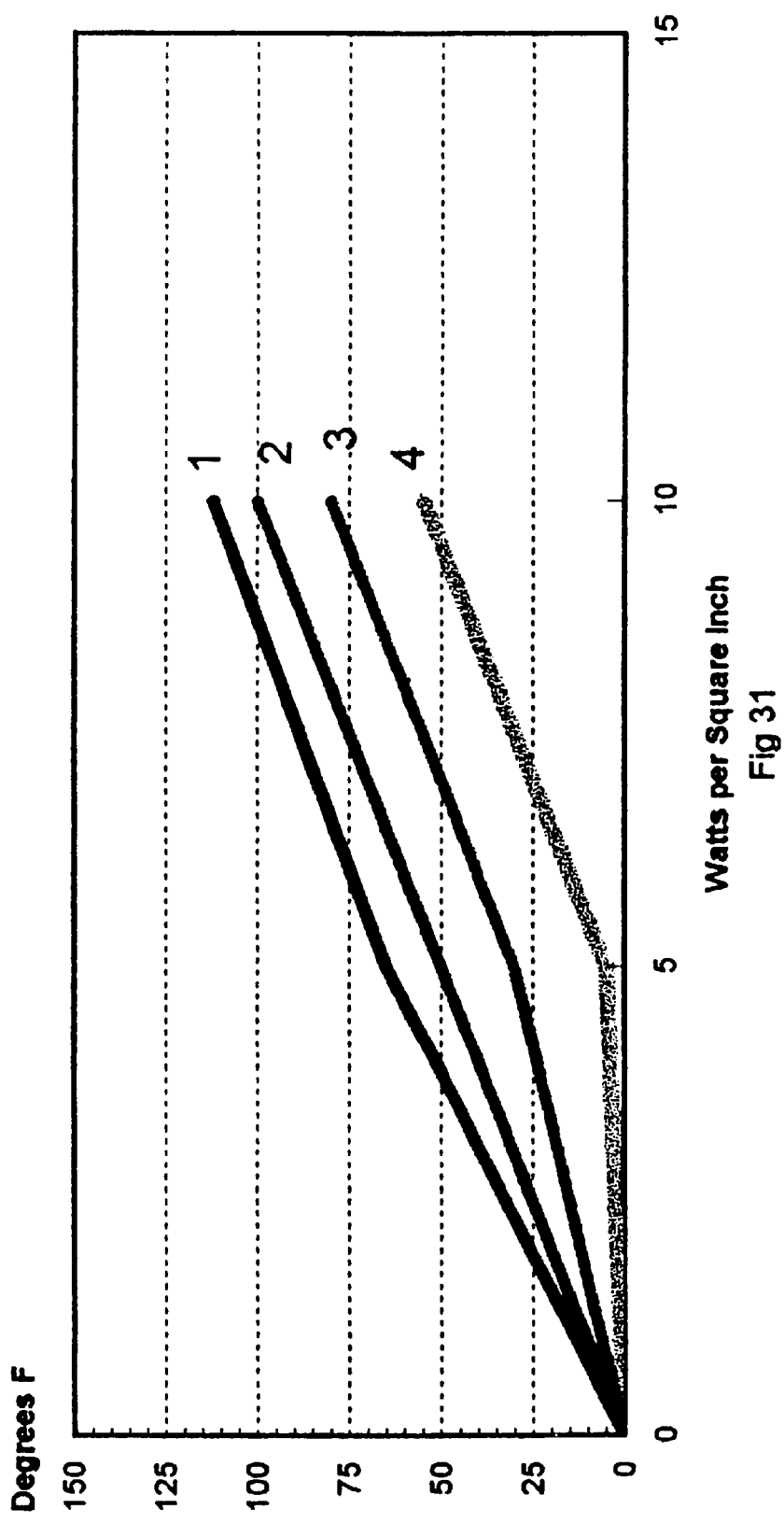
FIG. 31 is a graph of the watt densities versus the temperature of the outer surface of the heat-conducting layer of the tape under four different sets of atmospheric conditions.

The results of initial testing of the heat-conducting tape to determine the watt densities provided at the location of the thermocouple #3 on the Cessna 182-R wing under various environmental conditions are presented in FIG. 31. The dimensions of the tape were 6" wide×20" long. The Grafoil® had a thickness of 0.005 inches. Water droplets were sprayed on the wing at 0° F. or 20° F., at a simulated aircraft speed of 150 miles per hour (mph), to produce a liquid water content (LWC) of 0.75 g/m$^3$ or 1.5 g/m$^3$, respectively, and a mean volumetric water drop diameter (MVD) of 40 microns. The conditions of 20° F., no spray are represented by graph line 1; 0° F. are represented by graph line 2; 20° F., 0.75 LWC, 40 MVD are represented by graph line 3; and 0° F., 1.5 LWC, 40 MVD are represented by graph line 4.

Figure 32:
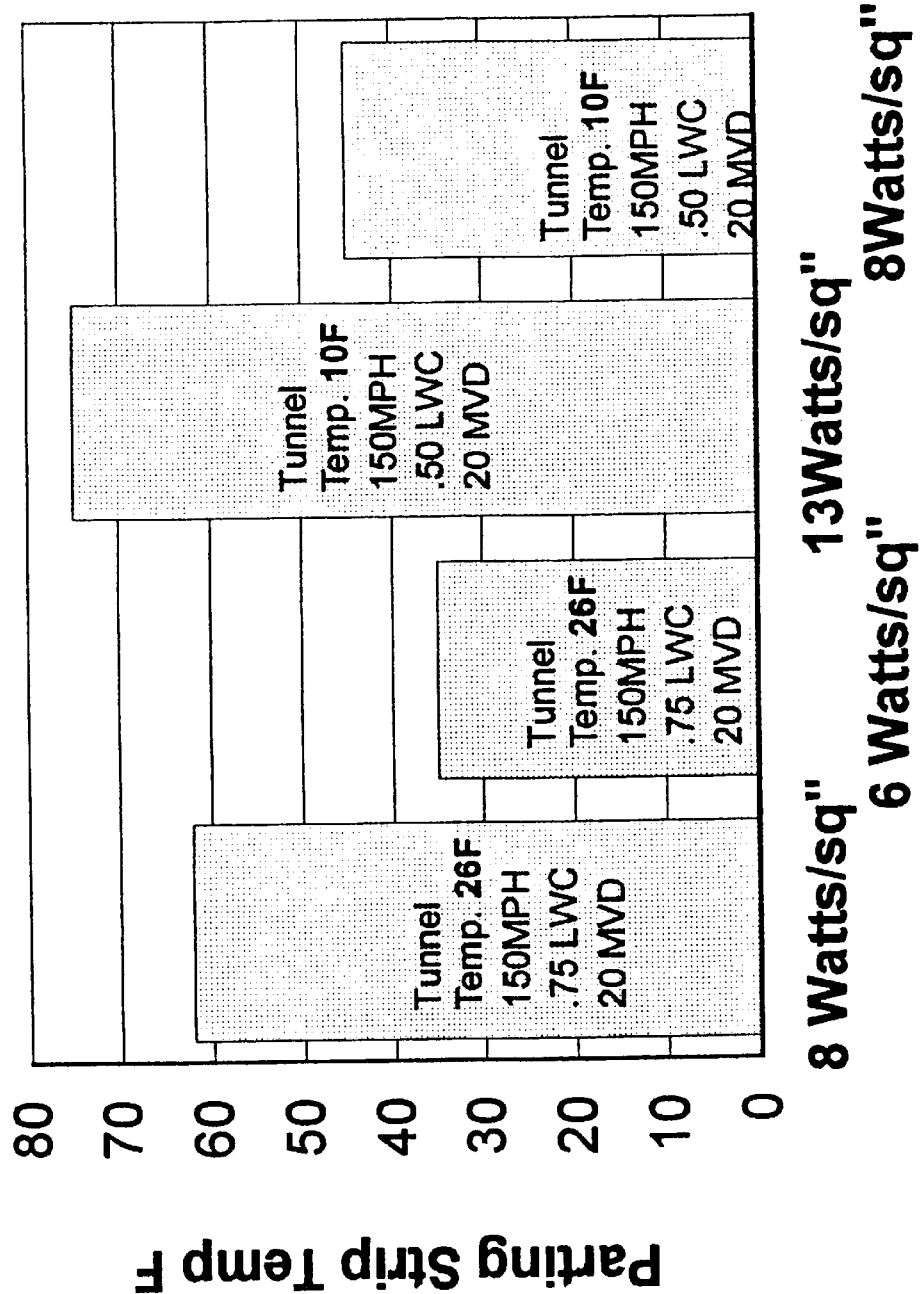
FIG. 32 is a histogram of the watt densities versus the temperature of the outer surface of the heat-conducting layer of the tape under four different sets of atmospheric conditions.

In another test, using the same tape and the Cessna wing, further tests were conducted to determine the power requirements to raise the temperature of the outer surface of the heat-conducting layer of the tape to various levels under a set of environmental conditions selected to fall well within the envelope of FAA regulations in FAR 25, Appendix C of FIG. 26. The results are illustrated in FIG. 32. For example, under icing tunnel conditions of 26° F., a simulated aircraft speed of 150 mph, an LWC of 0.75 g/m , and an MWD of 20 microns, 8 watts/in$^2$ were required to raise the temperature of the outer surface of the tape to about 62° F.; whereas 6 watts/in$^2$ produced a temperature of about 35° F. Similarly, under icing tunnel conditions of 10° F., a simulated aircraft velocity of 150 miles per hour (mph), a liquid water content (LWC) of 0.50 g/m$^3$, and a mean volumetric water drop diameter (MVD) of 20 microns, 13 watts/in$^2$ were required to raise the temperature of the outer surface of the heat-conducting layer to about 75° F.; whereas 8 watts/in$^2$ produced a temperature of about 45° F.

Figure 33:
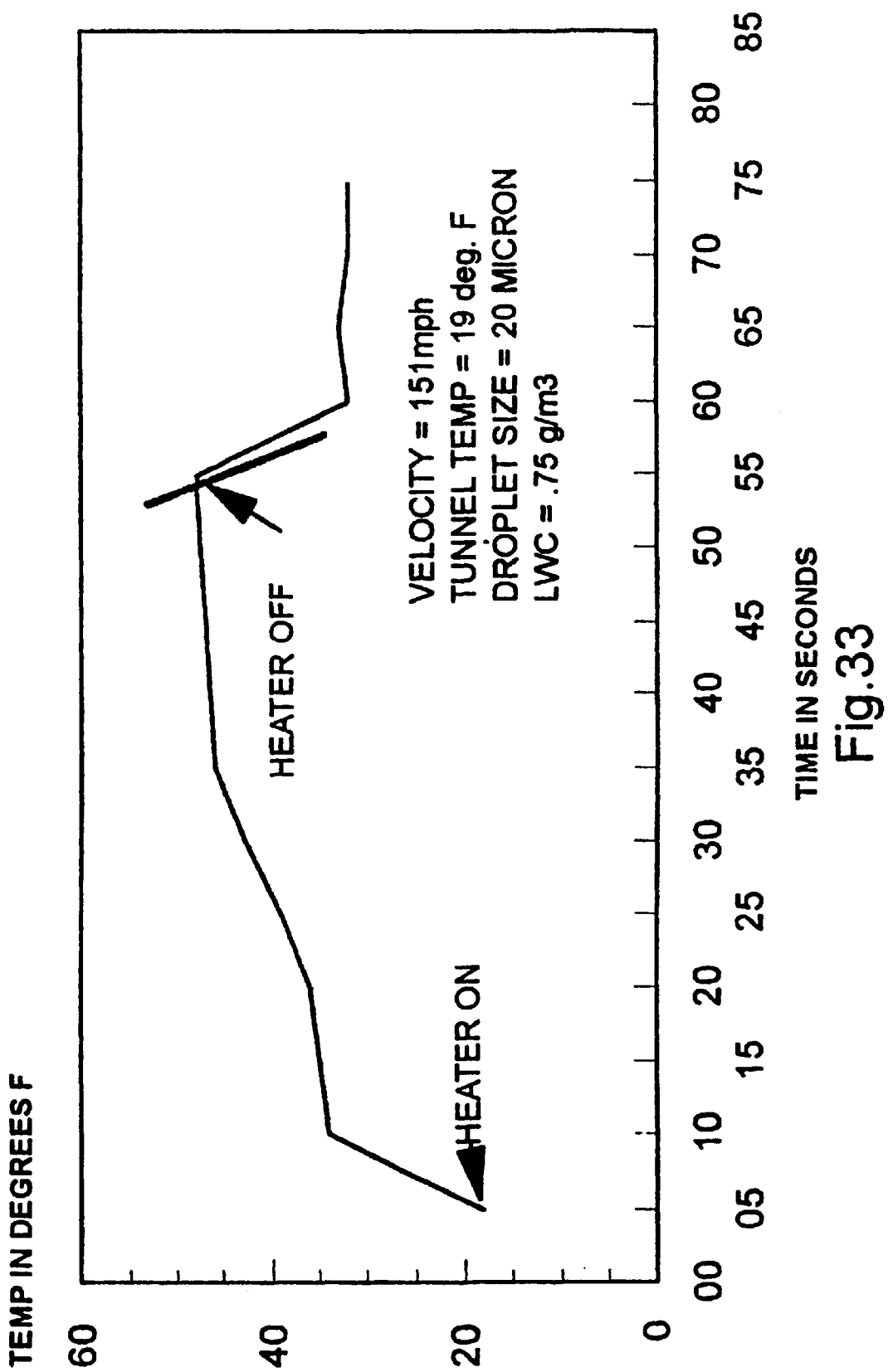
FIG. 33 is a graph illustrating the time to heat and time to cool the outer surface of the heat-conducting layer of the tape under a set of atmospheric conditions.

A further test was conducted on the Cessna wing and tape of the previous example to determine the time to heat up (at 7 watts/in$^2$) and cool down when power was turned off, under tunnel conditions of 19° F., aircraft velocity of 151 mph, LWC of 0.75 g/m$^3$ and MVD of 20 microns. As illustrated in FIG. 33, the time to heat to about 50° F. was about 50 seconds, and cool-down to 32° F. occurred in 5 seconds when power was turned off.

Figure 34:
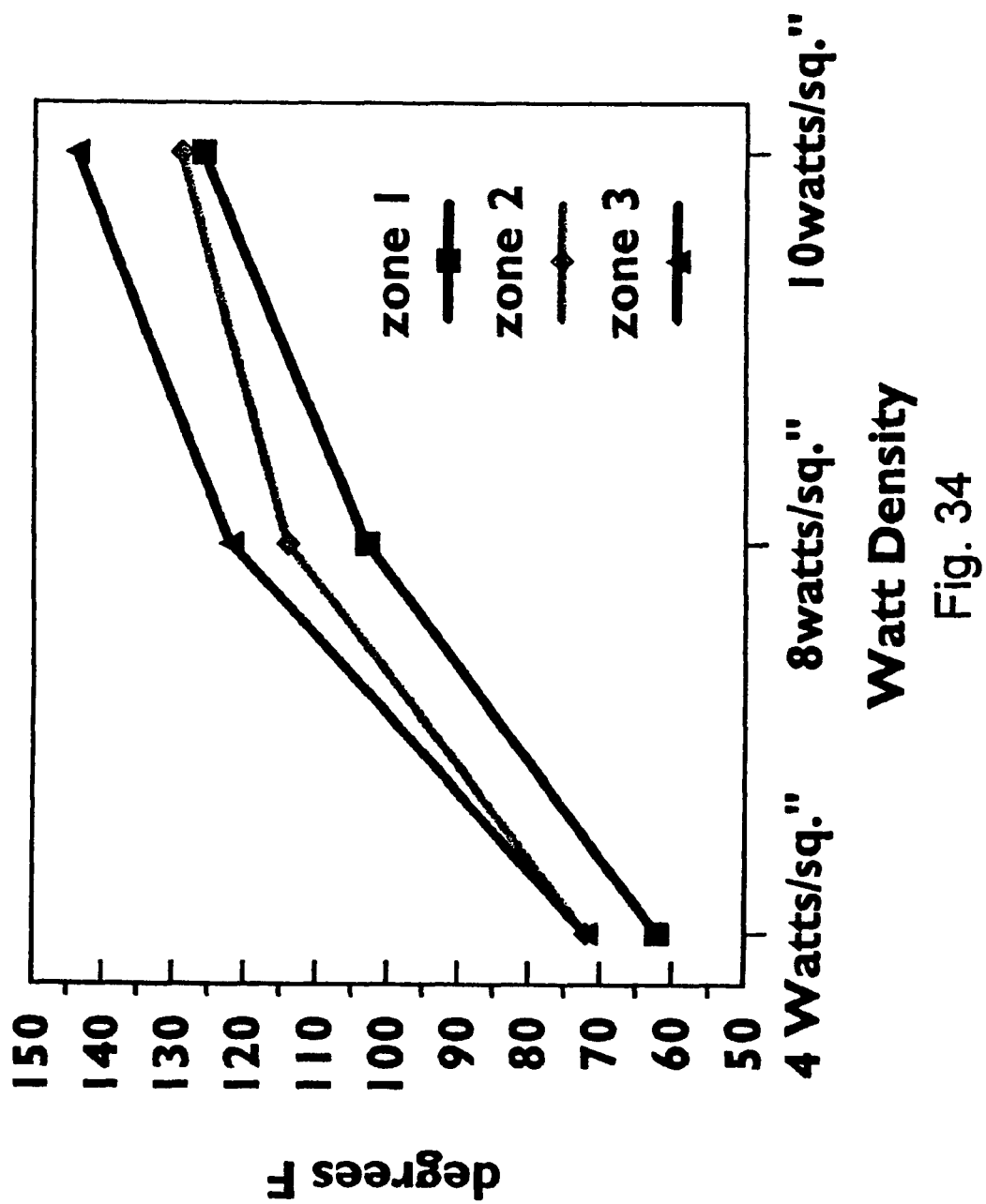
FIG. 34 is a graph illustrating the watt densities required to raise the temperatures of the parting strip zone, and the first and second ice accumulation and shedding zones.

Another test was conducted to determine the watt densities required to raise the temperatures of the first and second ice accumulation and shedding zones, labeled zones 2 and 3, respectively, in FIG. 30. Zone 1 is the parting strip. The heat-conducting tape was bonded with a rubber backing to the Lancair IV carbon composite wing. The tape was divided into the three zoned sections, each 2"×20", separated from each other by a gap not exceeding 60 mils. The thickness of the Grafoil® in zone 1 was 0.020 inches; and the thickness of the Grafoil® in each of zones 2 and 3 was 0.005 inches. Electrical power was applied to each zone separately so that tests using different watt densities in different zones could be accomplished. Three separate environmental conditions were selected, representing conditions within the specified FAR 25, Appendix C, envelope of FIG. 28. All tests were conducted at 20 MVD and a simulated aircraft velocity of 150 mph. Test 1 was conducted at 26° F. and 0.75 LWC; test 2 at 10° F. and 0.50 LWC; and test 2 at 10° F. and 0.44 LWC. The results, shown in FIG. 34, illustrate that watt densities of 4, 8 or 10 watts/in.$^2$ were sufficient to raise the temperature of all zones well above 32° F.

From the accumulated test data described above, it was determined that the flexible expanded graphite foil layer in the heat-conducting tape used in a zone de-icing system embodiment has a thickness in the parting strip, excluding the decreasing thickness gradients, of about 0.005 to about 0.060 inches. Similarly, it was determined that the thicknesses of the flexible expanded graphite foil layer in the first and second ice accumulation and shedding zones, excluding the thickness gradients, are the same as or different from each other and range from about 0.001 to about 0.050 inches, typically about 0.001 to about 0.030 inches. In the embodiment of the invention, wherein the foil sheets are layered to form a decreasing gradient of thicknesses between the parting strip and the first ice accumulation and shedding zone and between the parting strip and the second ice accumulation and shedding zones, the parting strip comprises at least two layered flexible expanded graphite foil sheets that may have thicknesses that are the same as or different from each other and range from about 0.0025 to about 0.047 inches. As described above, the maximum thickness of the flexible expanded graphite foil in the parting strip is always greater than the maximum thickness of the foil in both of the ice accumulation and shedding zones.

The width of the heat-conducting tape will be sufficient to accommodate a change in location of an icing stagnation line along the leading edge, will vary with the airfoil leading edge size, configuration, impingement area and expected angle of attack during icing conditions, and will be different for each aircraft. For example, the heat-conducting tape on a horizontal tail stabilizer on a Beechcraft Baron B55 may be 60 inches in length and 4 inches in width, including a parting strip having a one inch width. The width of the ice accumulation and shedding areas may be the same or different from each other. Other aircraft, such as those with a very thin leading edge and impingement area (e.g., Lancair IV horizontal tail stabilizers), may require a parting strip 0.25 inches in width and a total width of the heat-conducting tape of about 2 inches. Moreover, aircraft having a very large leading edge and impingement area (e.g., Cessna 421 wings), may require a parting strip of about 3 inches in width and a total width of the heat-conducting tape of about 8 inches. Thus, the parting strip width may vary from about 0.25 to about 3 inches, typically about 0.5 to about 2.5 inches, and more typically about 0.75 to about 1.5 inches. Similarly, the widths of the first and second ice accumulation and shedding zones may range from about one to about 6 inches, typically about 1.5 to about 5 inches, more typically about one to about 3 inches. Using the calculations and information provided herein, one skilled in the art will be able to determine the length, width and thicknesses of the heat-conducting tape and the flexible expanded graphite layer for any airfoil leading edge, without undue experimentation.

Figure 42:
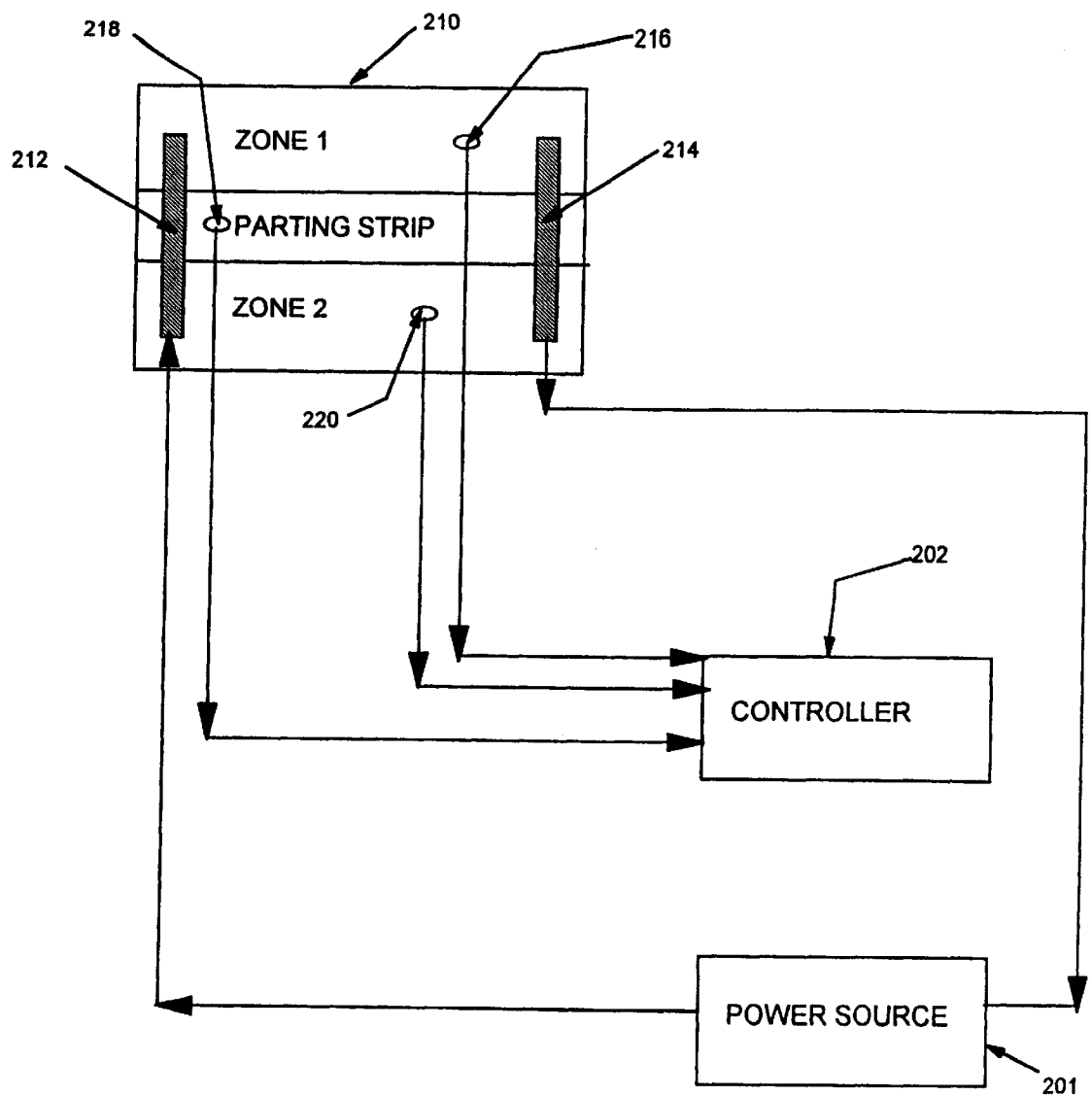
FIG. 42 is a block diagram illustrating the zoned electrothermal de-icing system connected to the components of FIG. 41.

Regardless of the configuration of the flexible expanded graphite layer of the heat-conducting tape, a further feature of the zoned de-icing embodiment of the invention is that the parting strip and each of the ice accumulation and shedding zones (Zone 1 and Zone 2) of the flexible expanded graphite foil layer are preferably connected to the power source by a single set of two electrical terminals 212 and 214, as illustrated in FIG. 42. A suitable electrical connection between the terminals and the power source is illustrated above in FIGS. 6 and 7. A current is transmitted through the foil 210 by establishing a voltage differential between the corresponding pair of terminals 212 and 214, resulting in heating of the foil 210. A given amount of power supplied to the flexible expanded graphite layer results in watt densities that differ between the parting strip and the ice accumulation and shedding zones, as governed by the predetermined thicknesses in these areas, and the temperature of the parting strip always exceeds that of the ice accumulation and shedding zones. Therefore, only a single control mechanism for a single set of electric terminals is necessary to produce desired watt densities and temperatures in the parting strip and ice accumulation and shedding zones, resulting in zoned de-icing system that is greatly simplified compared to previously known systems. Moreover, the use of only two terminals results in substantially fewer termination points or contact strips as potential cold spots that could detrimentally become anchor points for ice accumulation.

Figure 41:
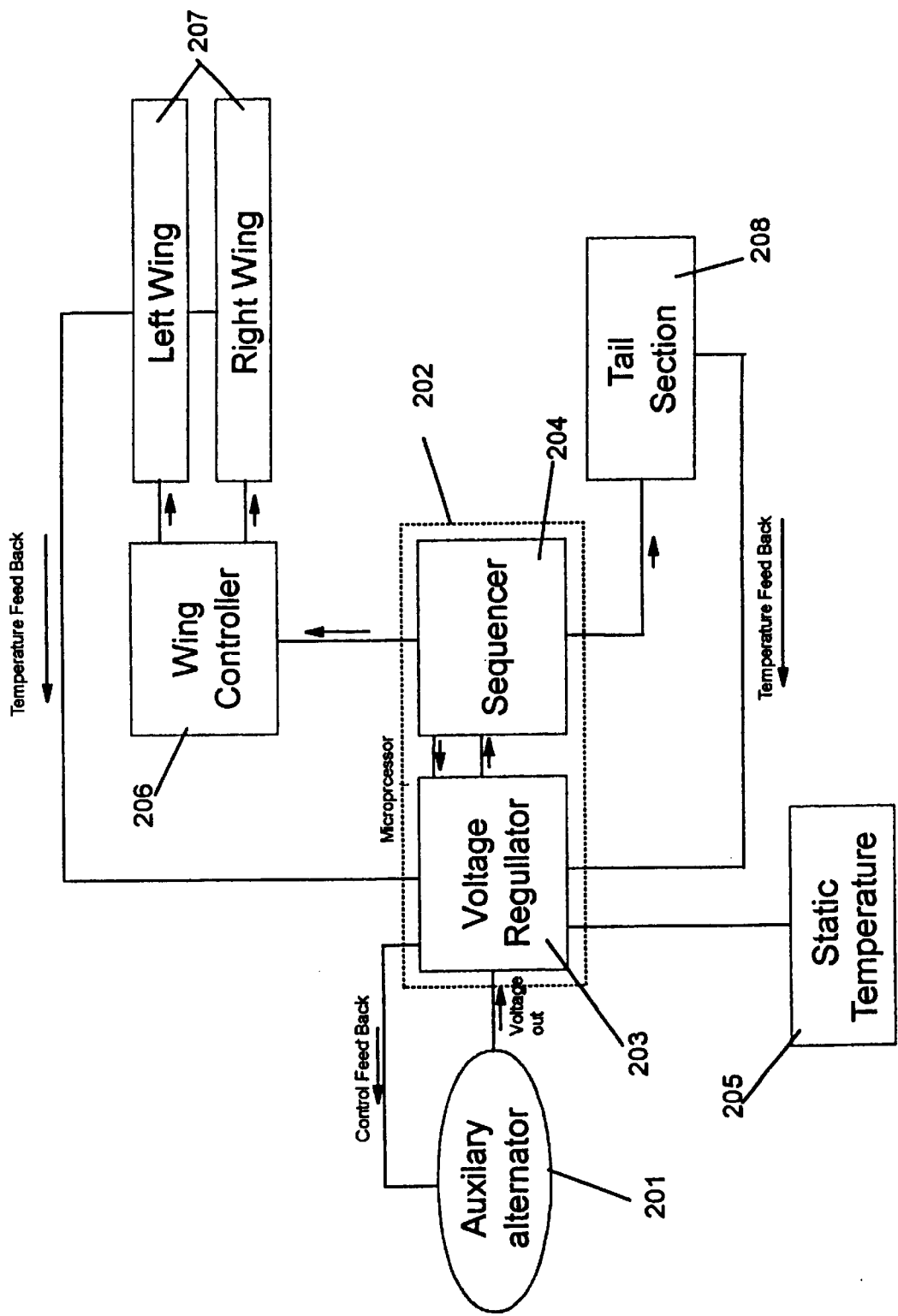
FIG. 41 is a block diagram illustrating components of the electrothermal de-icing system of the invention.

A system for electrothermally de-icing an aircraft structural member that includes a leading edge is illustrated in FIG. 41. A power source 201 on the aircraft energizes the electrothermal de-icing system, as is known to those skilled in the art. In light aircraft, an auxiliary alternator driven by the aircraft engine may serve as the power source 201. As described above, suitable auxiliary alternators for light aircraft are 150 ampere to 200 ampere alternators producing 40 to 60 volts, such as those available from EGC enterprises, inc., Chardon, Ohio. These alternators produce 150 amps at 50 volts, and the voltage is selectable. The alternator is connected to a programmable logic controller (microprocessor) 202 which controls the voltage output of the alternator by a voltage regulator 203. The controller 202 further contains a power sequencer 202 connected to the voltage regulator 203. The voltage regulator 203 is programmed to control the field voltage which, in turn controls the alternator output voltage. The voltage regulator 203 comprises a temperature feedback thermostat (not shown) that controls the output voltage to insure that the impingement zones (parting strips) of the de-icing system maintain a temperature slightly above freezing during or prior to an encounter with icing conditions. As described further below, the controller 202 continually samples static outside air temperature from a thermocouple 205, and compares the impingement zone temperatures and static temperatures to regulate the power output.

As schematically illustrated in FIG. 42, a first temperature sensor 218 is in communication with an outer surface of the heat-conducting layer in the parting strip area, and is in communication with the controller 202 for real time transmitting to the controller 202 of a first temperature value representing the real time temperature of the outer surface in the parting strip area of the heat-conducting layer. The controller 202 further comprises a receiving unit for receiving the first real time temperature value. As described further below, the controller is programmed to store a first predetermined reference temperature range for the first temperature; the controller is further programmed to compare the received real time first temperature value with the first predetermined reference temperature range; the controller is further programmed to indicate an acceptable first temperature when the received temperature value falls within the first predetermined reference range; and the controller is further programmed to signal the power source to provide more or less electrical energy to the flexible expanded graphite layer of the heat-conducting tape when the received first temperature falls outside the first predetermined reference temperature range.

Optionally, in addition to the first temperature sensor 218, there may be provided an optional second temperature sensor 216 and/or an optional third temperature sensor 220 in communication with an outer surface of the heat-conducting layer in at least one of the first and second ice accumulation and shedding zones, and in communication with the controller for optional real time transmitting to the controller of an optional second value representing the temperature of the outer surface of at least one of the first and second ice accumulation and shedding zones, wherein the controller further comprises a receiving unit for receiving the second real time temperature value. As described above for control of the temperature of the outer surface of the heat-conducting layer in the parting strip, the controller is programmed to store a second predetermined reference temperature range for the second temperature; the controller is further programmed to compare the received real time second temperature value with the second predetermined reference temperature range; the controller is further programmed to indicate an acceptable second temperature when the received second temperature values fall within the second predetermined reference range; and the controller is further programmed to signal the power source to provide more or less electrical energy to the flexible expanded graphite layer of the heat-conducting tape when the received second temperature falls outside the second predetermined reference temperature range.

The controller may optionally also be programmed to store a third predetermined reference temperature range for a third temperature, which is the temperature of the outer heat-conducting layer at the first and/or second ice accumulation zones as a result of an increased power supply to the flexible expanded graphite foil layer for a period of time sufficient to melt the ice-to-surface bond; the controller is then further programmed to compare the received real time third temperature value with the third predetermined reference temperature range; the controller is also further programmed to indicate an acceptable third temperature when the received third temperature value falls within the third predetermined reference range; and the controller is also further programmed to signal the power source to provide more or less electrical energy to the flexible expanded graphite layer of the heat-conducting tape when the received third temperature falls outside the third predetermined reference temperature range.

The sequencer 204, illustrated in FIG. 41, is within the microprocessor 202 and comprises a voltage sequencer and a timer. The sequencer 204 directs the output of the voltage regulator 203 to aircraft structural members subject to de-icing such as, but not limited to, the tail section 208 and the wing controller section 206. As described further below, the sequencer 204 directs a constant voltage during a first period of time to the flexible expanded graphite foil layer of the heat-conducting tape until a de-icing sequence takes place. During the de-icing sequence, the sequencer 204 is programmed to command the voltage regulator 203 to increase the controlled feedback voltage to the auxiliary alternator 201, thereby increasing the output voltage, according to a pre-programmed timed sequence. The sequencer 204 then directs the higher voltage from the voltage regulator 203 to a structural member to be de-iced, such as the tail section 208, for a regulated period of time. The power is then sequenced to another structural member, such as the wing controller 206, for a preselected time to de-ice the wings 207.

The wing controller 206 is programmed to cycle the voltage between the left and right wings 207. This enables the wing surfaces to receive maximum power during the de-ice sequence. The wing controller 206 has a preselected timer which controls the cycles between the left and right wings during the de-icing sequence.

While, or preferably prior to, encountering icing conditions, sufficient power is supplied from the power source 201 to the flexible expanded graphite foil layer of the heat-conducting tape to maintain the temperature of the outer heat-conducting layer at the parting strip area above freezing for a first time period to prevent the formation of ice on the parting strip. Preferably the temperature is maintained at about 33° F. to about 50° F., more preferably about 35° F. to about 45° F. When the heat-conducting tape is to be used in an anti-icing system embodiment, the temperature of the outer heat-conducting layer is sufficient to produce evaporation of substantially all water droplets impinging on the tape and may thus exceed 45° F. In the zoned de-icing system embodiment, the temperature of the outer heat-conducting layer at the parting strip during the first time period is sufficient to prevent freezing of substantially all water droplets impinging on the outer heat-conducting layer of the parting strip, and the water droplets are allowed to flow aft from the parting strip to the first and/or the second ice accumulation and shedding zones of the heat-conducting tape. In this zoned de-icing embodiment, the power supplied to the flexible expanded graphite layer in the first time period also maintains a temperature of the outer heat-conducting layer at the first and/or the second ice accumulation and shedding zones that is freezing or below freezing, to allow the water droplets to form ice and an ice-to-surface bond in one or more of these zones. The length of the first time period will depend on the rate of icing which, in turn, depends on the environmental conditions, including the temperature, liquid water content, mean volumetric droplet diameter, the velocity of the aircraft, and the like. The first time period may be about 5 seconds to about 5 minutes, typically about 15 seconds to about 2 minutes and, more typically, about 30 seconds to about 1.5 minutes.

At the end of the first time period, when a desired amount of ice has accumulated on the surface of the ice accumulation and shedding zones of the heat-conducting tape, the power supplied to the flexible expanded graphite foil layer is subsequently increased and directed to the foil layer for a second period of time, wherein the increased power is sufficient to melt the ice-to-surface bond and to allow formed ice to be shed into an impinging airstream. During the second time period, the temperature is typically maintained in a range of about 37° F. to about 40° F., but may be as low as 34° F. The second time period is about 5 seconds to about 2.5 minutes, typically about 15 seconds to about 1.5 minutes, especially about 30 seconds to about one minute.

Thus, a method for electrothermal de-icing of an aircraft structural member that includes a leading edge subjected to an impinging airstream during flight, the airstream passing over an outer surface of the structural member in a fore to aft direction, comprises the steps of (a) bonding a heat-conducting tape to the outer surface of the structural member, wherein the heat-conducting tape comprises a first area that forms a parting strip having a length disposed spanwise along the leading edge, a second area disposed spanwise above and aft of the parting strip forming a first ice accumulation and shedding zone, and a third area disposed spanwise below and aft of the parting strip forming a second ice accumulation and shedding zone, wherein the heat-conducting tape comprises at least two layers laminated to each other under heat and pressure, the layers comprising (i) an outer heat-conducting layer that is an electrical insulator, and (ii) a non-metallic conductive layer connected to a power source by a single set of two terminals, the non-metallic conductive layer consisting of a flexible expanded graphite foil sheet having a first thickness in the parting strip, a second thickness in the first ice accumulation and shedding zone, and a third thickness in the second ice accumulation and shedding zone, wherein the thickness of the flexible expanded graphite foil sheet in the parting strip is greater than the thickness of the foil sheet in either of the first or the second ice accumulation and shedding zones; (b) supplying power to the flexible expanded graphite foil layer for a first period of time to maintain a first temperature of the outer heat-conducting layer at the parting strip that is sufficient to prevent freezing of impinging water droplets and to allow water droplets to flow aft from the parting strip to the first and/or the second ice accumulation and shedding zones, wherein the power supply also maintains, in the first period of time, a second temperature of the outer heat-conducting layer at the first and/or second ice accumulation and shedding zones which is freezing or below freezing, to allow formation of ice and an ice-to-surface bond on the outer heat-conducting layer at the first and/or second ice accumulation and shedding zones; and (c) subsequently increasing the power supply to the flexible expanded graphite foil layer for a second period of time, wherein the increased power supply is sufficient to melt the ice-to-surface bond at the first and/or second ice accumulation and shedding zones and to allow formed ice to be shed into the impinging airstream.

Preferably, the method further comprises the step of sensing the presence of atmospheric icing conditions prior to the supplying power step and, more preferably, further comprises the step of sensing the presence of atmospheric icing conditions during the supplying power and the increasing the power supply steps. The method also preferably comprises repeating the supplying power step and the subsequent increasing power step until atmospheric icing conditions are no longer sensed.

It is a further feature of the embodiments of the invention, that when the temperature is raised to above 32° F. in the ice accumulation and shedding areas, the watt density in the parting strip is also raised, e.g., to 22.4 watts/in.$^2$ from 5 watts/in.$^2$, with a concomitant rapid rise in temperature (e.g., to about 80° F. to about 90° F.) in the parting strip. Because of the high thermal conductivity of the flexible expanded graphite foil, heat transfer from the parting strip to the ice accumulation and shedding zones occurs, resulting in a decreased requirement for power to raise the temperature in these zones, than would ordinarily be expected. The heat transfer from the parting strip to the ice accumulation and shedding zones is also enhanced because of the gradient of current flowing through the thickness gradients between the parting strip and these zones.

The following example illustrates the de-icing capabilities of the zoned de-icing system embodiment of the heat-conducting tape of the invention. The example is not to be considered limiting, however, as other heat conducting outer layers, adhesives, insulating layers, thicknesses of these layers, and densities and dimensions of the flexible expanded graphite foil layer, and the like, may be used in the practice of the invention.

The de-icing test was conducted at the Icing Research Tunnel of NASA Glenn Research in Cleveland, Ohio.

EXAMPLE 1

The heat-conducting tape comprised Grafoil® having a density of 90 lbs./ft.$^3$, laminated to a layer of mineral filled polyurethane material (Staystik™) having a thickness of 0.003 inches. The tape was bonded with a rubber backing by a rubber-based contact adhesive (1300-L, 3M Company) forming an adhesive layer of about 0.010 inches thick to the Lancair IV carbon composite wing. The tape was divided into the three zoned sections, each 2"×20", separated from each other by a gap not exceeding 60 mils. Zone 1 was the parting strip, having a Grafoil® thickness of 0.020 inches. Zones 2 and 3 were the lower and upper ice accumulation and shedding zones, respectively, having a Grafoil® thickness of 0.005 inches. Electrical power was applied to each zone separately so that tests using different watt densities in different zones could be accomplished. Three separate environmental conditions were selected, representing conditions within the specified FAR 25, Appendix C, envelope of FIG. 28.

Figure 35:
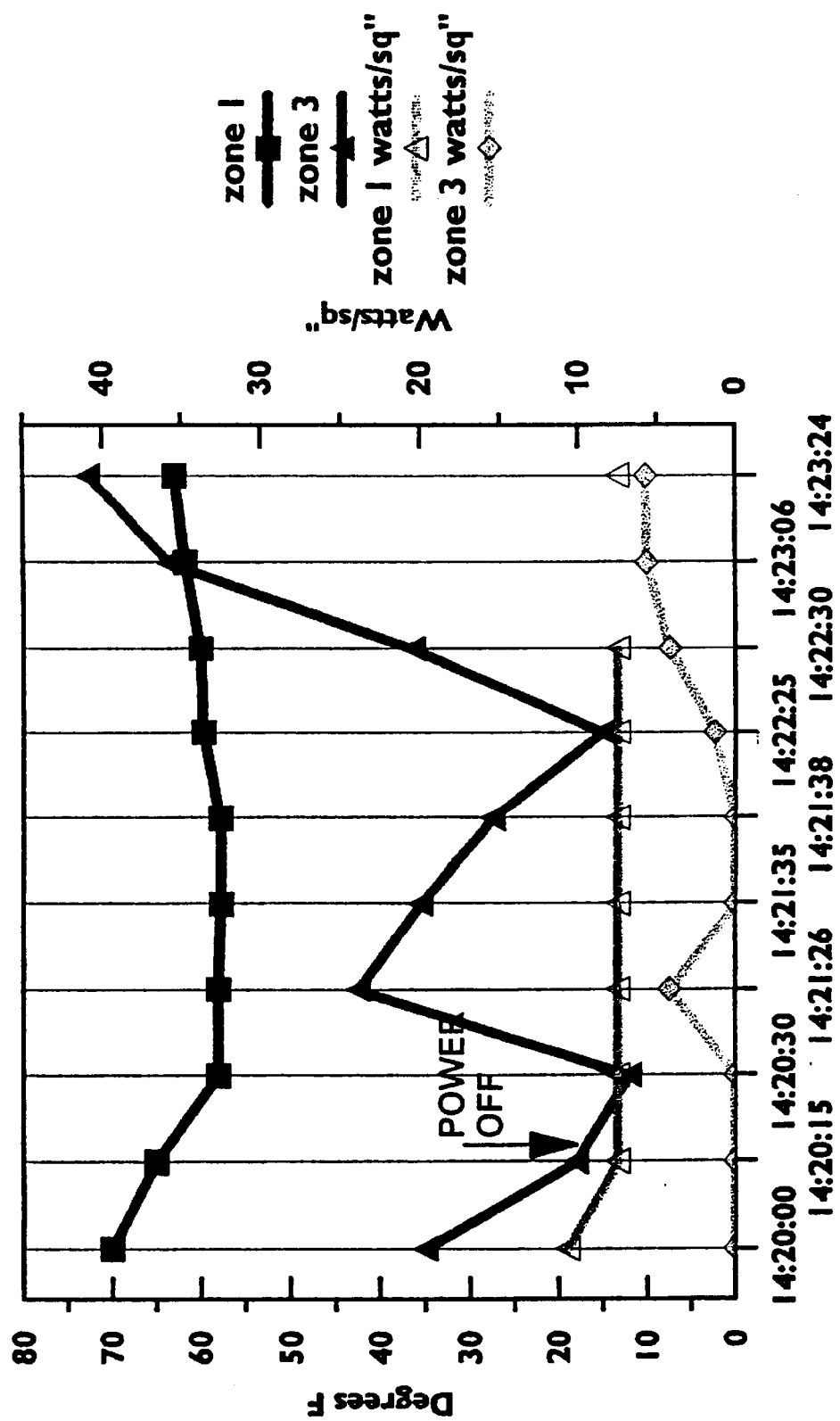
FIG. 35 is a graph illustrating a power off condition in a single de-icing sequence.
Figure 36:
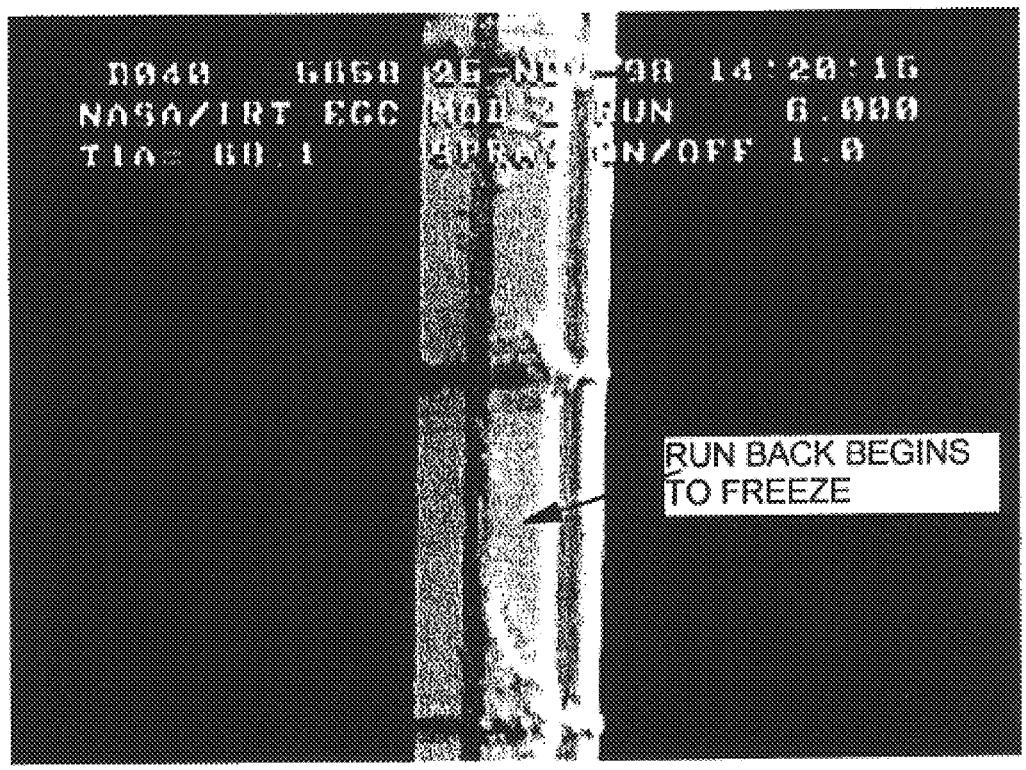
FIG. 36 is a digital photograph showing runback ice forming on an ice accumulation and shedding zone of the heat-conducting tape bonded to the leading edge of a Lancair IV wing.
Figure 38:
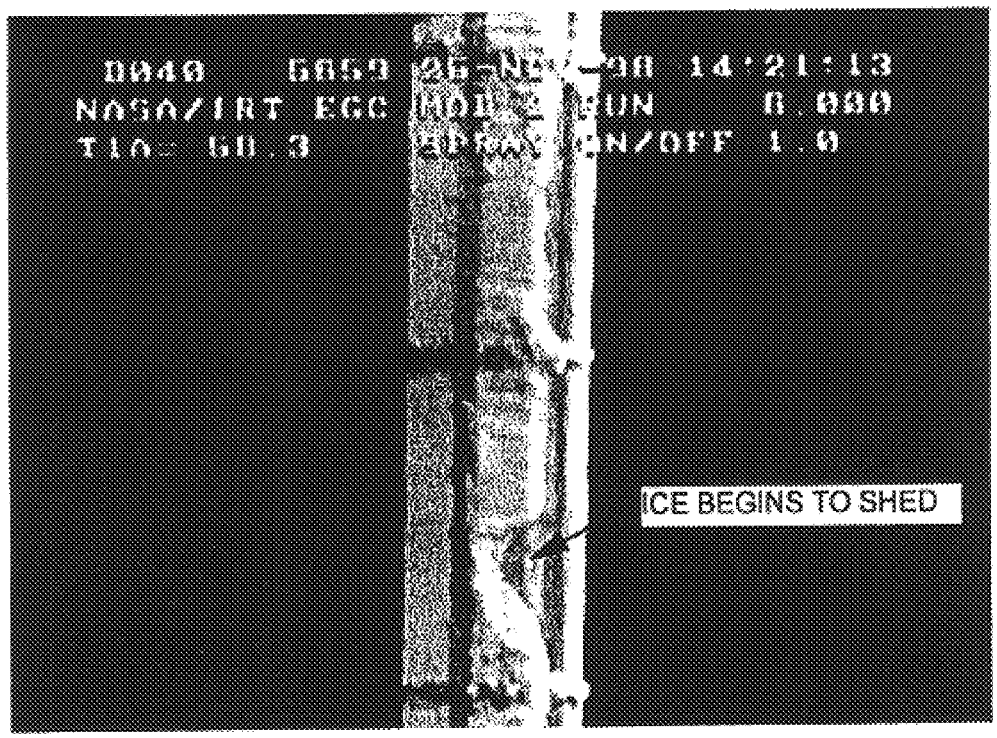
FIG. 38 is a digital photograph showing the initial shedding of the runback ice of FIG. 36.
Figure 37:
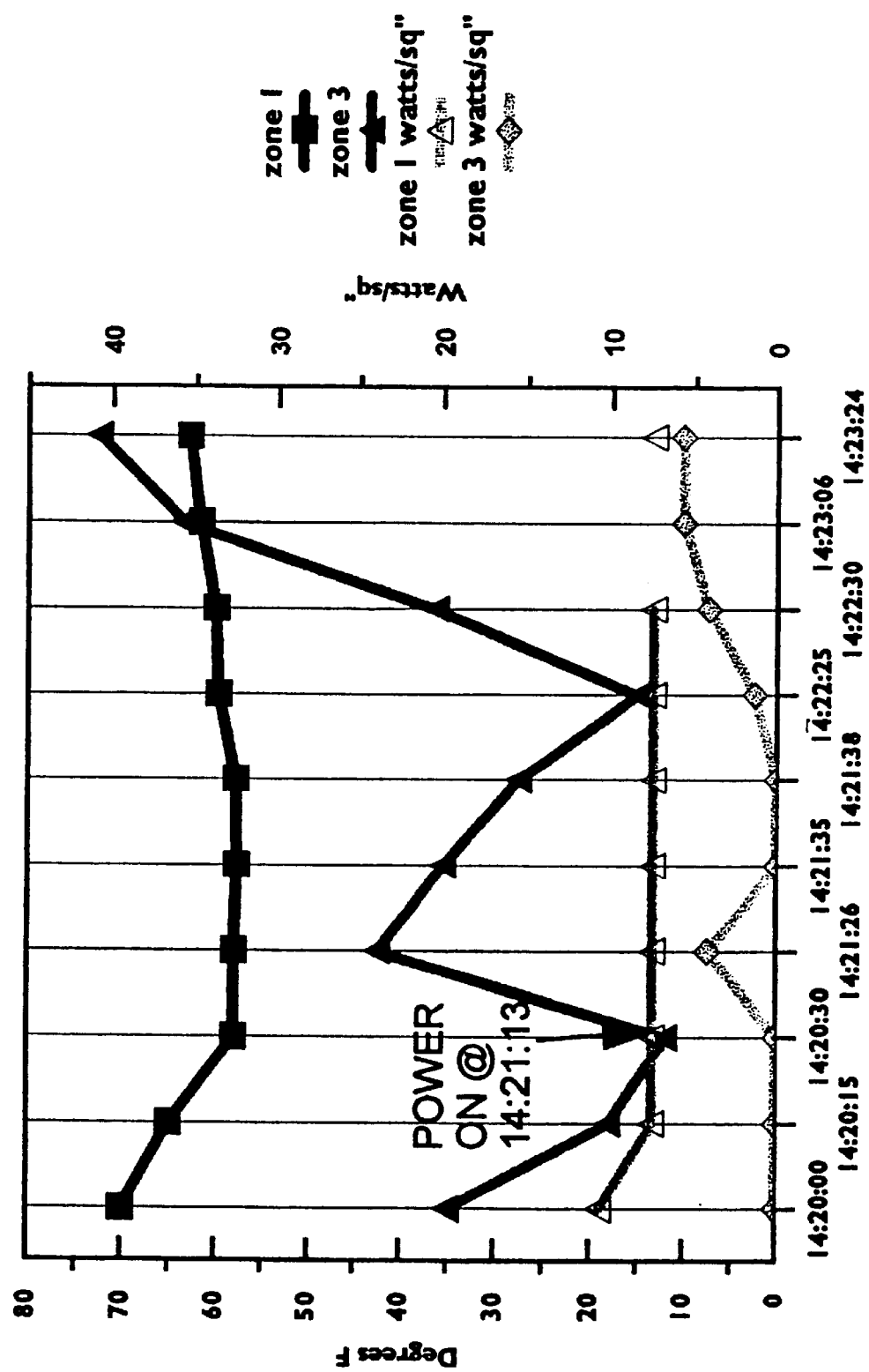
FIG. 37 is a graph illustrating a power on condition in the single de-icing sequence.
Figure 39:
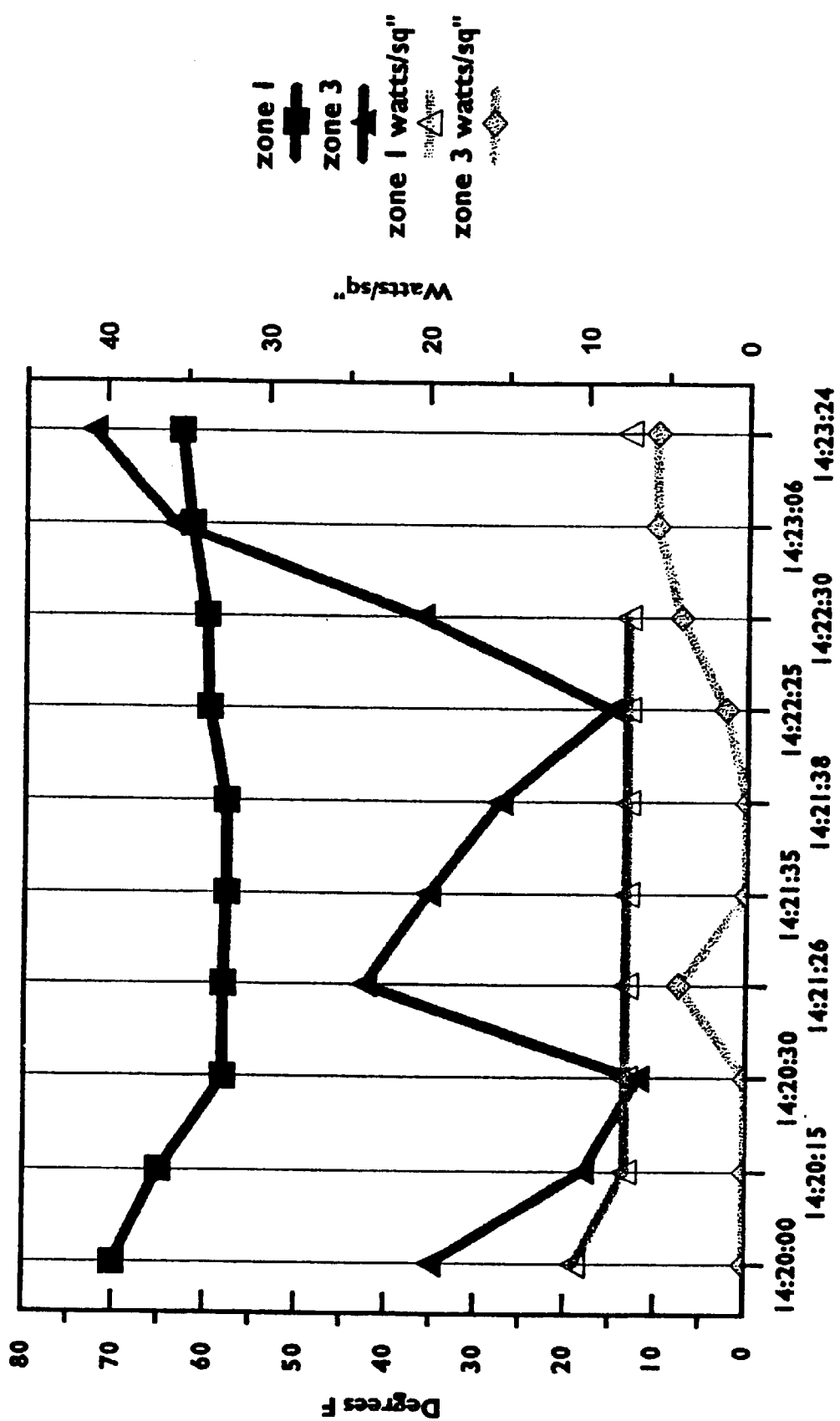
FIG. 39 is a graph illustrating time following the power on condition of FIG. 37.
Figure 40:
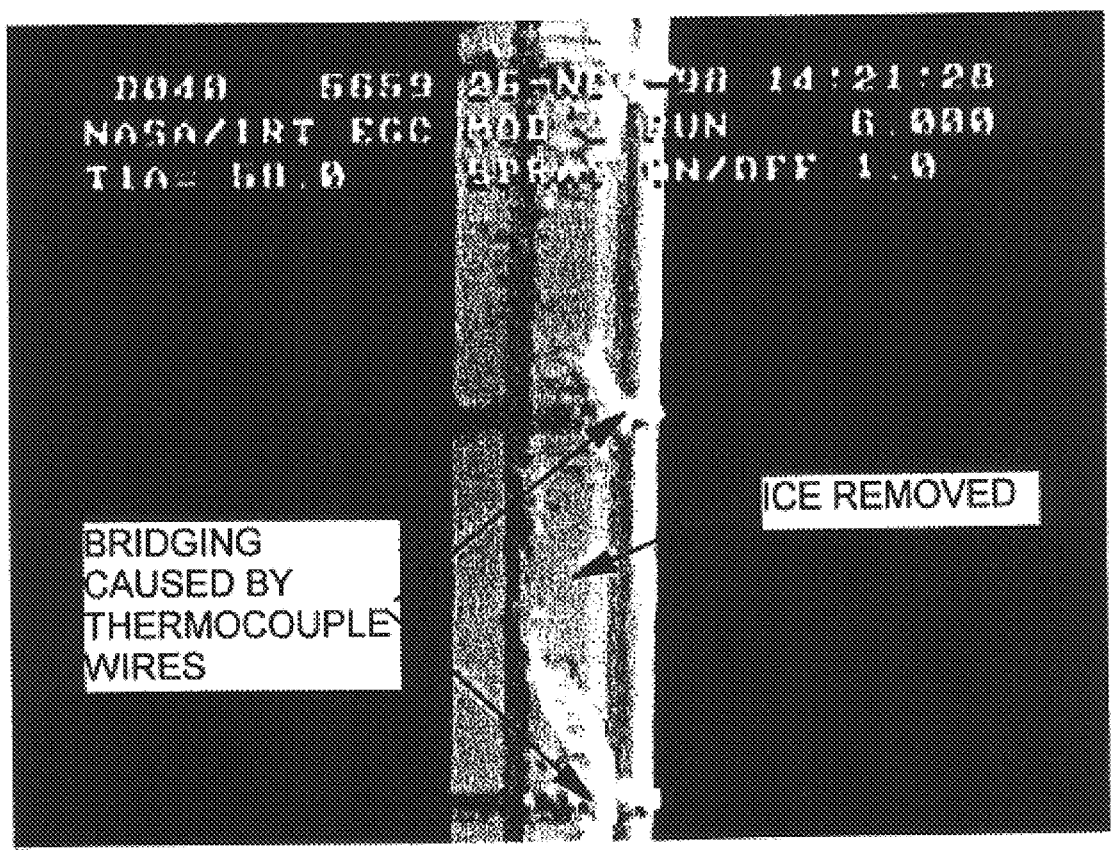
FIG. 40 is a digital photograph showing the removal of the runback ice of FIG. 39.

A single de-ice sequence was run on the zoned de-icing system. The electrical current provided was 8 watts. The environmental conditions were 10° F., a simulated aircraft velocity of 150 mph, an LWC of 0.50 and an MVD of 20.61. The power on-off sequence is illustrated in FIGS. 35, 37 and 39, with the graphs indicating the temperature of the outer heat-conducting layer of the tape and watts/in. at the parting strip (zone 1) and at ice accumulation and shedding zone (zone 3). The corresponding actual runback icing accumulation and ice shedding on the outer surface of the heat-conducting tape bonded to the wing segment are illustrated in FIGS. 36, 38 and 40. The parting strip zone 1 is to the right of the picture and the impinging airstream is moving from right to left. Zone 3 is in the center of the picture.

At the beginning of the de-icing sequence, at time 14 hours, 20 minutes, zero seconds (14:20:00), shown in FIG. 35, the parting strip and zone 3 have already been heated to 70° F. and 35° F., respectively. At time 14:20:00, the power is turned off in zone 3 and the watt density in zone 3 is zero. (The power is maintained at 8 watts in the parting strip, zone 1, at all times). During the 15 second duration of power off, the temperature of zone 3 falls to below 32° F., (ie., about 11° F.). At time 14:20:15 runback ice has begun to freeze on the outer surface of zone 3, as is seen in FIG. 36. In FIG. 37, the power is turned on in zone 3 at time 14:20:30 to achieve 5 watts/in. . By time 14:21:13, ice has already begun to shed from zone 3 (FIG. 38) and by time 14:21:26 (FIG. 39), the ice has been shed from zone 3 into the impinging airstream (FIG. 40).

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

We claim:

1. An electrothermal de-icing system for an aircraft structural member that includes a leading edge subject to an impinging airstream during flight, said airstream passing over an outer surface of the structural member in a fore to aft direction, the system comprising:

a heat-conducting tape bonded to the outer surface of the structural member, the heat-conducting tape comprising a first area that forms a parting strip having a length disposed spanwise along the leading edge, a second area disposed spanwise above and aft of the parting strip forming a first ice accumulation and shedding zone, and a third area disposed spanwise below and aft of the parting strip forming a second ice accumulation and shedding zone, wherein the heat-conducting tape comprises at least two layers laminated to each other under heat and pressure, the layers comprising (i) an outer heat-conducting layer that is an electrical insulator, and (ii) a non-metallic conductive layer connected to a power source, the non-metallic conductive layer consisting of a flexible expanded graphite foil sheet having a first thickness in the parting strip, a second thickness in the first ice accumulation and shedding zone, and a third thickness in the second ice accumulation and shedding zone, wherein the thickness of the flexible expanded graphite foil sheet in the parting strip is greater than the thickness of the foil sheet in either of the first or the second ice accumulation and shedding zones;

an electronic connection for connecting the flexible expanded graphite layer to the power source; and a programmable controller configured (i) to direct a supply of power from the power source to the flexible expanded graphite foil layer of the heat-conducting tape for a first period of time, to maintain a first temperature of the outer heat-conducting layer at the parting strip that is sufficient to prevent freezing of impinging water droplets and to allow water droplets to flow aft from the parting strip to the first and/or the second ice accumulation and shedding zones of the heat-conducting tape, and wherein the power supply also maintains, in the first period of time; a second temperature of the outer heat-conducting layer at the first and/or second ice accumulation and shedding zones which is freezing or below freezing to allow formation of ice and an ice-to-surface bond on the outer heat-conducting layer at the first and/or second ice accumulation and shedding zones, and (2) to subsequently direct an increased power supply to the flexible expanded graphite foil layer of the heat-conducting tape for a second period of time, wherein the increased power supply is sufficient to melt the ice-to-surface bond at the first and/or second ice accumulation and shedding zones and to allow formed ice to be shed into the impinging airstream.

2. The electrothermal de-icing system of claim 1, wherein the flexible expanded graphite foil sheet is connected to the power source by a single set of two terminals.

3. The electrothermal de-icing system of claim 1, wherein the first temperature is about 33° F. to about 50° F.

4. The electrothermal de-icing system of claim 3, wherein the first temperature is about 35° F. to about 45° F.

5. The electrothermal de-icing system of claim 1, wherein the first time period is about 5 seconds to about 5 minutes.

6. The electrothermal de-icing system of claim 5, wherein the first time period is about 15 seconds to about 2 minutes.

7. The electrothermal de-icing system of claim 6, wherein the first time period is about 30 seconds to about 1.5 minutes.

8. The electrothermal de-icing system of claim 1, wherein the second time period is about 5 seconds to about 2.5 minutes.

9. The electrothermal de-icing system of claim 8, wherein the second time period is about 15 seconds to about 1.5 minutes.

10. The electrothermal de-icing system of claim 9, wherein the second time period is about 30 seconds to about one minute.

11. The electrothermal de-icing system of claim 1, further comprising:

a first temperature sensor in communication with an outer surface of the heat-conducting layer in the parting strip area, and in communication with the controller for real time transmitting to the controller of a first value representing the temperature of the outer surface in the parting strip area of the heat-conducting layer, wherein the controller further comprises a receiving unit for receiving the real time first temperature value; wherein the controller is programmed to store a first predetermined reference temperature range for the first temperature; the controller is further programmed to compare the received real time first temperature value with the first predetermined reference temperature range; the controller is further programmed to indicate an acceptable first temperature when the received temperature value falls within the first predetermined reference range; and the controller is further programmed to signal the power source to provide more or less electrical energy to the flexible expanded graphite layer of the heat-conducting tape when the received first temperature falls outside the first predetermined reference temperature range.

12. The electrothermal de-icing system of claim 11, further comprising:

a second temperature sensor in communication with an outer surface of the heat-conducting layer in at least one of the first and second ice accumulation and shedding zones, and in communication with the controller for real time transmitting to the controller of a second value representing the temperature of the outer surface of at least one of the first and second ice accumulation and shedding zones, wherein the controller further comprises a receiving unit for receiving the real time second temperature value, wherein the controller is programmed to store a second predetermined reference temperature range for the second temperature; the controller is further programmed to compare the received real time second temperature value with the second predetermined reference temperature range; the controller is further programmed to indicate an acceptable second temperature when the received temperature value falls within the second predetermined reference range; and the controller is further programmed to signal the power source to provide more or less electrical energy to the flexible expanded graphite layer of the heat-conducting tape when the received second temperature falls outside the second predetermined reference temperature range.

13. The electrothermal de-icing system of claim 12, wherein the second temperature sensor transmits to the controller a third real time temperature of the outer heat-conducting layer at the first and/or second ice accumulation zones in the second period of time; the controller is programmed to receive the real time third temperature value; the controller is programmed to store a third predetermined reference temperature range for the third temperature; the controller is programmed to compare the received real time third temperature value with the third predetermined reference temperature range; the controller is further programmed to indicate an acceptable third temperature when the received third real time temperature value falls within the third predetermined reference range; and the controller is also further programmed to signal the power source to provide more or less electrical energy to the flexible expanded graphite layer of the heat-conducting tape when the received third temperature falls outside the third predetermined reference temperature range.

14. The electrothermal de-icing system of claim 13, wherein the third real time temperature is about 34° F. to about 40° F.

15. The electrothermal de-icing system of claim 1, wherein the flexible expanded graphite foil sheet is a continuous sheet comprising a decreasing gradient of thicknesses between the parting strip and the first ice accumulation and shedding zone and between the parting strip and the second ice accumulation and shedding zone.

16. The electrothermal de-icing system of claim 15, wherein the thickness of the flexible expanded graphite foil sheet in the parting strip, excluding the decreasing thickness gradients, is about 0.005 to about 0.060 inches.

17. The electrothermal de-icing system of claim 15, wherein the thicknesses of the flexible expanded graphite foil sheet in the first and second ice accumulation and shedding zones, excluding the thickness gradients, are the same as or different from each other and range from about 0.001 to about 0.050 inches.

18. The electrothermal de-icing system of claim 17, wherein the thicknesses of the foil sheet in the ice accumulation and shedding zones range from about 0.001 to about 0.030 inches.

19. The electrothermal de-icing system of claim 1, wherein the parting strip comprises at least two layered flexible expanded graphite foil sheets.

20. The electrothermal de-icing system of claim 19, wherein the foil sheets have thicknesses that are the same as or different from each other and range from about 0.0025 to about 0.047 inches.

21. The electrothermal de-icing system of claim 19, wherein the layered foil sheets form a decreasing gradient of thicknesses between the parting strip and the first ice accumulation and shedding zone and between the parting strip and the second ice accumulation and shedding zone.

22. The electrothermal de-icing system of claim 1, wherein the flexible expanded graphite foil sheet comprises at least two separate sections selected from the group consisting of a parting strip section, a first ice accumulation and shedding section, and a second ice accumulation and shedding section, wherein the first or the second ice accumulation and shedding sections are separated from the parting strip section by a gap of no greater than about 60 mils.

23. The electrothermal de-icing system of claim 22, wherein the parting strip section or at least one of the ice accumulation and shedding zone sections of the flexible expanded graphite foil sheet comprises a decreasing gradient of thicknesses between the parting strip and the first ice accumulation and shedding zone or between the parting strip and the second ice accumulation and shedding zone.

24. The electrothermal de-icing system of claim 1, wherein the parting strip has a width that is sufficient to accommodate a change in location of an icing stagnation line along the leading edge.

25. The electrothermal de-icing system of claim 24, wherein the width of the parting strip is about 0.25 to about 3 inches.

26. The electrothermal de-icing system of claim 25, wherein the width of the parting strip is about 0.5 to about 2.5 inches.

27. The electrothermal de-icing system of claim 26, wherein the width of the parting strip is about 0.75 to about 1.5 inches.

28. The electrothermal de-icing system of claim 1, wherein each of the first and second ice accumulation and shedding zones comprises an area approximately equal to its respective area of ice accumulation.

29. The electrothermal de-icing system of claim 1, wherein the first and the second ice accumulation and shedding zones comprise widths that are the same as or different from each other and range from about 1 to about 6 inches.

30. The electrothermal de-icing system of claim 29, wherein the widths of the first and the second ice accumulation and shedding zones range from about 1.5 to about 5 inches.

31. The electrothermal de-icing system of claim 30, wherein the widths of the first and the second ice accumulation and shedding zones range from about 1 to about 3 inches.

32. The electrothermal de-icing system of claim 1, wherein the flexible expanded graphite foil sheet has a density of about 50 to about 95 lbs./ft$^3$.

33. The electrothermal de-icing system of claim 32, wherein the flexible expanded graphite foil sheet has a density of about 70 to about 95 lbs./ft$^3$.

34. The electrothermal de-icing system of claim 33, wherein the flexible expanded graphite foil sheet has a density of about 80 to about 95 lbs./ft$^3$.

35. The electrothermal de-icing system of claim 1, wherein the flexible expanded graphite foil sheet has an electrical resistivity of about $2.7 \times 10^{-4}$ to about $3.2 \times 10^{-4}$ ohm-in.

36. The electrothermal de-icing system of claim 35, wherein the flexible expanded graphite foil sheet has an electrical resistivity of about $3.1 \times 10^{-4}$ ohm-in.

37. The electrothermal de-icing system of claim 1, wherein the outer heat-conducting layer is selected from electrically insulating materials having a volume resistivity of about $10^3$ ohm-in. to about $10^{12}$ ohm-in.

38. The electrothermal de-icing system of claim 37, wherein the outer heat-conducting layer comprises a thermoplastic or a thermosetting material and an inorganic filler that conducts heat.

39. The electrothermal de-icing system of claim 38, wherein the inorganic filler is selected from the group consisting of aluminum nitride, boron nitride, alumina, silicon nitride, and mixtures thereof.

40. The electrothermal de-icing system of claim 39, wherein the material comprises polyurethane.

41. The electrothermal de-icing system of claim 1, wherein the outer heat-conducting layer has a thermal conductivity of about 0.1 W/M° K to about 5 W/M° K.

42. The electrothermal de-icing system of claim 41, wherein the outer heat-conducting layer has a thermal conductivity of about 0.5 W/M° K to about 4 W/M° K.

43. The electrothermal de-icing system of claim 1, wherein the thickness of the outer heat-conducting layer is about 0.001 inches to about 0.030 inches.

44. The electrothermal de-icing system of claim 43, wherein the thickness of the outer heat-conducting layer is about 0.001 inches to about 0.010 inches.

45. The electrothermal de-icing system of claim 44, wherein the thickness of the outer heat-conducting layer is about 0.005 inches.

46. The electrothermal de-icing system of claim 1, wherein the heat-conducting tape further comprises an electrically insulating layer, wherein the flexible expanded graphite layer is disposed between the outer heat-conducting layer and the insulating layer.

47. The electrothermal de-icing system of claim 46, wherein the insulating layer is a component of the heat-conducting tape or is a component of the aircraft surface.

48. The electrothermal de-icing system of claim 46, wherein the insulating layer is a heat insulator.

49. The electrothermal de-icing system of claim 46, wherein the insulating layer has a thickness of about 0.005 inches to about 0.250 inches.

50. The electrothermal de-icing system of claim 1, wherein the structural member comprises a rotor blade or a propeller blade and the heat-conducting tape further comprises an outer erosion-resistant layer bonded to the outer heat-conducting layer.

51. The electrothermal de-icing system of claim 50, wherein the outer erosion-resistant layer comprises a selection from the group consisting of titanium, nickel, aluminum, stainless steel, and alloys thereof.

52. A method for electrothermal de-icing of an aircraft structural member that includes a leading edge subjected to an impinging airstream during flight, said airstream passing over an outer surface of the structural member in a fore to aft direction, the method comprising the steps of:

bonding a heat-conducting tape to the outer surface of the structural member, wherein the heat-conducting tape comprises a first area that forms a parting strip having a length disposed spanwise along the leading edge, a second area disposed spanwise above and aft of the parting strip forming a first ice accumulation and shedding zone, and a third area disposed spanwise below and aft of the parting strip forming a second ice accumulation and shedding zone, wherein the heat-conducting tape comprises at least two layers laminated to each other under heat and pressure, the layers comprising (i) an outer heat-conducting layer that is an electrical insulator, and (ii) a non-metallic conductive layer connected to a power source by a single set of two terminals, the non-metallic conductive layer consisting of a flexible expanded graphite foil sheet having a first thickness in the parting strip, a second thickness in the first ice accumulation and shedding zone, and a third thickness in the second ice accumulation and shedding zone, wherein the thickness of the flexible expanded graphite foil sheet in the parting strip is greater than the thickness of the foil sheet in either of the first or the second ice accumulation and shedding zones;

supplying power to the flexible expanded graphite foil layer for a first period of time to maintain a first temperature of the outer heat-conducting layer at the parting strip that is sufficient to prevent freezing of impinging water droplets and to allow water droplets to flow aft from the parting strip to the first and/or the second ice accumulation and shedding zones, wherein the power supply also maintains, in the first period of time, a second temperature of the outer heat-conducting layer at the first and/or second ice accumulation and shedding zones which is freezing or below freezing, to allow formation of ice and an ice-to-surface bond on the outer heat-conducting layer at the first and/or second ice accumulation and shedding zones; and subsequently increasing the power supply to the flexible expanded graphite foil layer for a second period of time, wherein the increased power supply is sufficient to melt the ice-to-surface bond at the first and/or second ice accumulation and shedding zones and to allow formed ice to be shed into the impinging airstream.

53. The method of claim 52, further comprising the step of sensing the presence of atmospheric icing conditions prior to the supplying power step.

54. The method of claim 53, further comprising the step of sensing the presence of atmospheric icing conditions during the supplying power and the increasing the power supply steps.

55. The method of claim 53, further comprising the step of repeating the supplying power step and the subsequent increasing power step until atmospheric icing conditions are no longer sensed.

* * * * *